(12) United States Patent
Matsumoto et al.

(10) Patent No.: US 10,301,515 B2
(45) Date of Patent: *May 28, 2019

(54) EASILY DISMANTLABLE ADHESIVE COMPOSITION AND EASILY DISMANTLABLE ADHESIVE TAPE

(75) Inventors: Akikazu Matsumoto, Osaka (JP); Eriko Sato, Osaka (JP); Akinori Morino, Kitaadachi-gun (JP); Koujirou Tanaka, Takaishi (JP)

(73) Assignees: DIC CORPORATION, Tokyo (JP); OSAKA CITY UNIVERSITY, Osaka (JP)

( * ) Notice: Subject to any disclaimer, the term of this patent is extended or adjusted under 35 U.S.C. 154(b) by 108 days.

This patent is subject to a terminal disclaimer.

(21) Appl. No.: 14/122,299

(22) PCT Filed: Jun. 1, 2012

(86) PCT No.: PCT/JP2012/064300
§ 371 (c)(1),
(2), (4) Date: Nov. 26, 2013

(87) PCT Pub. No.: WO2012/165623
PCT Pub. Date: Dec. 6, 2012

(65) Prior Publication Data
US 2014/0194546 A1    Jul. 10, 2014

(30) Foreign Application Priority Data

Jun. 2, 2011  (JP) ................................ 2011-124507
Sep. 25, 2011  (JP) ................................ 2011-215490

(51) Int. Cl.
C09J 133/04    (2006.01)
C09J 7/38    (2018.01)
(Continued)

(52) U.S. Cl.
CPC ............ C09J 153/00 (2013.01); C08F 293/00 (2013.01); C08F 293/005 (2013.01); C09J 7/385 (2018.01);
(Continued)

(58) Field of Classification Search
CPC ...... C09J 153/00; C09J 153/005; C09J 11/02; C09J 133/08; C09J 133/12; C09J 7/0221;
(Continued)

(56) References Cited

U.S. PATENT DOCUMENTS 6,703,073 B2    3/2004  Husemann et al.
6,806,320 B2    10/2004  Everaets et al.
(Continued)

FOREIGN PATENT DOCUMENTS

CN    1278544 A    1/2001
EP    2186867 A1    5/2010
(Continued)

OTHER PUBLICATIONS

U.S. Appl. No. 14/122,476, filed Nov. 26, 2013.
(Continued)

*Primary Examiner* — Jessica M Roswell
(74) *Attorney, Agent, or Firm* — Westerman, Hattori, Daniels & Adrian, LLP

(57) ABSTRACT

An easily dismantlable adhesive composition containing: an acrylic block polymer having a poly(meth)acrylate chain (A) formed of a carboxyl precursor group-containing (meth)acrylate monomer (a) and a poly(meth)acrylate chain (B) that contains, as monomer components, a (meth)acrylate (b) having an alkyl group having 1 to 14 carbon atoms and a polar group-containing monomer (c); and either an acid catalyst or an acid generator, makes it possible to achieve favorable adhesiveness and dismantlability and suppress stick-slip at the time of dismantlement.

12 Claims, 20 Drawing Sheets

MEASUREMENT RESULT OF PEEL DISTANCE / PEEL STRENGTH (EXAMPLE 1)

(51) Int. Cl.
*C09J 153/00* (2006.01)
*C09J 133/08* (2006.01)
*C08F 293/00* (2006.01)

(52) U.S. Cl.
CPC .............. *C09J 7/387* (2018.01); *C09J 133/08* (2013.01); *C09J 153/005* (2013.01); *C09J 2433/00* (2013.01)

(58) Field of Classification Search
CPC ........ C09J 7/0217; C09J 2433/00; C08F 2/50; C08F 293/00; C08F 293/005
See application file for complete search history.

(56) References Cited

U.S. PATENT DOCUMENTS

| | | | |
|---|---|---|---|
| 2003/0096075 A1* | 5/2003 | Dollase | C08F 293/005 428/40.1 |
| 2004/0009113 A1 | 1/2004 | Sion | |
| 2004/0028895 A1 | 2/2004 | Yamakami et al. | |
| 2005/0234199 A1* | 10/2005 | Taniguchi | C08F 293/005 525/242 |
| 2007/0265404 A1 | 11/2007 | Yamago et al. | |
| 2008/0194759 A1* | 8/2008 | Casper | C08F 293/00 524/556 |
| 2009/0299008 A1 | 12/2009 | Yamago et al. | |
| 2012/0070660 A1* | 3/2012 | Miyazaki | C09J 133/08 428/355 AC |
| 2012/0196952 A1* | 8/2012 | Suzuki | A61K 6/0023 523/116 |

FOREIGN PATENT DOCUMENTS

| | | |
|---|---|---|
| JP | 56-500889 A | 7/1981 |
| JP | 09-137145 A | 5/1997 |
| JP | 10-140093 A | 5/1998 |
| JP | 11-143079 A | 5/1999 |
| JP | 2001-270912 A | 10/2001 |
| JP | 2002-167566 A | 6/2002 |
| JP | 2003-313527 A | 11/2003 |
| JP | 2004-043732 A | 2/2004 |
| JP | 2004-323693 A | 11/2004 |
| JP | 2005-023205 A | 1/2005 |
| JP | 2006-225524 A | 8/2006 |
| JP | 2006-299278 A | 11/2006 |
| JP | 2007-186606 A | 7/2007 |
| JP | 2008-291216 A | 12/2008 |
| JP | 2009-149877 A | 7/2009 |
| JP | 2010-070597 A | 4/2010 |
| JP | 2010-241961 A | 10/2010 |
| JP | 2012-126879 A | 7/2012 |
| KR | 20000063981 A | 11/2000 |
| WO | 81/00309 A1 | 2/1981 |
| WO | 2004/014818 A1 | 2/2004 |
| WO | 2006/001496 A1 | 1/2006 |
| WO | 2006/062255 A1 | 6/2006 |
| WO | 2010/126123 A1 | 11/2010 |

OTHER PUBLICATIONS

U.S. Appl. No. 14/122,589, filed Nov. 26, 2013.
U.S. Appl. No. 14/124,167, filed Dec. 5, 2013.
Office Action dated Dec. 18, 2014, issued in related Chinese Patent Application No. 201280026905.5, with English translation (11 pages).
Michalak et al., "DFT Studies on the Copolymerization of α-Olefins with Polar Monomers: Ethylene-Methyl Acrylate Copolymerization Catalyzed by a Pd-Based Diimine Catalyst", J. Am. Chem. Soc., 2001, vol. 123, No. 49, pp. 12266-12278, Office Action dated May 28, 2015, issued in U.S. Appl. No. 14/122,476.
Office Action dated May 28, 2015, issued in U.S. Appl. No. 14/122,476 (11 pages).
International Search Report of PCT/JP2012/064300, dated Aug. 14, 2012.
International Search Report of PCT/JP2012/064303, dated Aug. 14, 2012.
International Search Report of PCT/JP2012/064295, dated Aug. 21, 2012.
International Search Report of PCT/JP2012/064485, dated Sep. 4, 2012.
Benedek I et al., Technology of Pressure-Sensitive Adhesives and Products, CRC Press, 2009, p. 7 vol. 4; U.S. Office Action dated Nov. 17, 2014 U.S. Appl. No. 14/122,476.
Extended European Search Report dated Oct. 1, 2014, issued in corresponding European Application No. 12793071.7. (6 pages).
Extended European Search Report dated Oct. 1, 2014, issued in corresponding European Application No. 12793415.6 (6 pages).
Extended European Search Report dated Oct. 1, 2014, issued in corresponding European Application No. 12792020.5. (6 pages).
Non-Final Office Action dated Nov. 17, 2014, issued in related U.S. Appl. No. 14/122,476 (14 pages).
U.S. Office Action dated Sep. 29, 2015 for related U.S. Appl. No. 14/124,167 (12 pages).
Communication pursuant to Rule 164(1) EPC dated May 20, 2015, issued in counterpart European Patent Application No. 12796812.1 (4 pages).
Iizawa, et al., "Thermal acid-catalyzed deesterification of poly(t-butyl acrylate)s using thermo-generated acid catalysts", Kobunshi Ronbunshu, Aug. 1998, pp. 490-496, vol. 55, No. 8, w/English abstract, European Communication dated May 20, 2015 (7 pages).
Yavuz, et al., "Electrorheological Properties of Suspensions Prepared from Poly(Li-tert-butyl methacrylate) Ionomer", Turkish Journal of Chemistry, 2004, pp. 587-601; European Search Report dated May 26, 2015.
Notice of Allowance dated Nov. 4, 2015, issued in U.S. Appl. No. 14/122,476 (12 pages).
Notice of Allowance dated Apr. 13, 2018, issued in Korean Application No. 10-2013-7034275, with translation.

* cited by examiner

EASILY DISMANTLABLE ADHESIVE COMPOSITION AND EASILY DISMANTLABLE ADHESIVE TAPE

TECHNICAL FIELD

The present invention relates to an easily dismantlable adhesive tape, which is stuck to an adherend or fixes articles to each other and then is easily taken off from the adherend or makes it easy to dismantle the fixed articles after a certain period of time has passed, and an easily dismantlable adhesive composition for producing the easily dismantlable adhesive tape.

BACKGROUND ART

As bonding members having excellent workability and a high reliability of adhesiveness, adhesive tapes are being used for fixing parts in various industrial fields of OA equipment, IT and home appliances, automobiles, and the like, temporarily fixing parts, labeling for displaying product information, and the like. In recent years, in view of protection of the global environment, in the various industrial fields of home appliances, automobiles, and the like, there has been an increased demand for used products to be recycled or reused. In order to recycle or reuse various products, it is necessary to perform an operation of peeling the adhesive tape used for fixing parts or labeling. However, because the adhesive tape can be placed anywhere on the product, implementing a simple removal step to reduce operational costs is desired.

As an easily dismantlable adhesive tape, for example, there is a disclosure regarding an adhesive member having two or more adhesive layers having different degrees of adhesive force (see Patent Document 1). The adhesive tape is an adhesive member which is bonded to an adherend through a weak adhesive layer in the adhesive member including adhesive layers having a superimposed structure. In this way, the adhesive tape firmly affixes to the adherend and is easily dismantled by using the weak adhesive layer as a peeling surface. However, the adhesive member has a problem that the production cost thereof becomes high since multiple adhesive layers are required as essential constituents. Furthermore, since the member is adhered to an adherend through a weak adhesive layer, there is a limit on increasing the adhesive force, and accordingly, it is difficult to use the adhesive member to firmly fix articles.

As another easily dismantlable adhesive composition, there is a disclosure regarding an adhesive composition containing aliphatic polyester (see Patent Document 2). According to the disclosure, when being dipped into warm water for a peeling operation, the adhesive composition can be easily peeled by hydrolysis-accelerating action of polycaprolactone. However, in order to be peeled off, the adhesive composition disclosed needs to be dipped in warm water. Therefore, when the size of a member to be dismantled is large, the cost of equipment increases, and the composition cannot be applied to parts for which water cannot be used, such as in the case of reusing electronic parts.

Furthermore, even when the adhesive force of an adhesive tape is greatly reduced at the time of dismantlement, if stick-slip occurs when the adhesive tape is peeled off from an adherend or when the adhesive layer is peeled off from a substrate, sometimes parts of various industrial products are broken when the products are recycled or reused, adhesive residues partially remain in the parts, or workability deteriorates when a large number of articles are dismantled.

Moreover, as an adhesive composition using an acrylic block copolymer, there is a disclosure regarding an adhesive composition containing a block copolymer which is obtained by producing an acrylic copolymer having a carboxyl precursor group (—COOt-butyl) in an acrylic polymer block and then substituting the carboxyl precursor group with a carboxyl group (see Patent Document 3). The adhesive composition has a step of producing an acrylic copolymer having a t-butyl group on the side chain, as the carboxyl precursor. However, the t-butyl group does not remain in the obtained adhesive composition, and the composition does not have dismantlability.

PRIOR ART DOCUMENT

Patent Document

[Patent Document 1] Japanese Unexamined Patent Application, First Publication No. H10-140093
[Patent Document 2] Japanese Unexamined Patent Application, First Publication No. H19-137145
[Patent Document 3] Japanese Unexamined Patent Application, First Publication No. 2002-167566

SUMMARY OF INVENTION

Problems to be Solved by the Invention

An object of the present invention is to provide an easily dismantlable adhesive tape, which adheres well to an object, can fix parts to each other, and can be easily dismantled by heating or energy ray irradiation even if water such as warm water is not used for the dismantlement, and an easily dismantlable adhesive composition that can realize the easily dismantlable adhesive tape.

Another object of the present invention is to provide an easily dismantlable adhesive tape, which makes it difficult for stick-slip to occur even when the adhesive tape is peeled off from an adherend at the time of dismantlement, or when the adhesive layer is peeled off from a substrate, and an adhesive composition that can realize the easily dismantlable adhesive tape.

Solution to the Problems

The present invention includes the following embodiments.

(1) An easily dismantlable adhesive composition containing: an acrylic polymer; and either an acid catalyst or an acid generator, in which the acrylic polymer is an acrylic block polymer having: a poly(meth)acrylate chain (A) formed of a carboxyl precursor group-containing (meth)acrylate monomer (a); and a poly(meth)acrylate chain (B) that contains, as monomer components, a (meth)acrylate (b) having an alkyl group having 1 to 14 carbon atoms, the (meth)acrylate (b) not being the carboxyl precursor group-containing (meth) acrylate monomer (a), and a polar group-containing monomer (c).

(2) The easily dismantlable adhesive composition according to (1), in which the carboxyl precursor group-containing (meth)acrylate monomer (a) is at least one selected from the group consisting of tert-butyl (meth)acrylate, 2-methyl-2-adamantyl (meth)acrylate, 2-ethyl-2-adamantyl (meth)acrylate, bornyl (meth)acrylate, isoboryl (meth)acrylate, cyclohexyl (meth)acrylate, and benzyl (meth)acrylate.

(3) The easily dismantlable adhesive composition according to (1) or (2), in which the (meth)acrylate (b) having an alkyl group having 1 to 14 carbon atoms is at least one selected from the group consisting of 2-ethylhexyl (meth) acrylate and n-butyl (meth)acrylate.

(4) The easily dismantlable adhesive composition according to any one of (1) to (3), in which a ratio of the poly(meth)acrylate chain (A) to the poly(meth)acrylate chain (B) in the acrylic polymer is 75/25 to 1/99 in terms of a molar ratio of (A)/(B).

(5) The easily dismantlable adhesive composition according to any one of (1) to (4), in which the content of the polar group-containing monomer (c) is 1 to 30% by mass based on the total monomer components forming the acrylic block polymer.

(6) An easily dismantlable adhesive tape including an adhesive layer formed of the easily dismantlable adhesive composition according to any one of (1) to (5).

Effects of the Invention

According to the easily dismantlable adhesive composition of the present invention, adhesive properties of the acrylic polymer do not deteriorate, and the composition is easily dismantled without leaving an adhesive residue by simple methods such as heating or light-irradiation at the time of dismantlement. Further, even when the initial adhesive force is strong, favorable dismantlability can be realized. In addition, since the composition uses a polar group-containing monomer and has a structural unit having dismantlability in the form of a block, dismantlability thereof at an interface between the adhesive and a substrate or at an interface between the adhesive and an adherend is improved. Consequently at the time of dismantlement, the adhesive tape can be easily peeled off from the adherend, or the adhesive layer can be easily peeled off from the substrate, whereby the composition can be favorably dismantled. Accordingly, the composition can be suitably used, without particular limitation, for fixing parts, temporarily fixing parts, labeling for displaying product information, or the like, in various industrial fields of OA equipment, IT and home appliances, automobiles, or the like, to be recycled or reused. Moreover, at the time of dismantlement, the composition can be easily dismantled by a simple heating equipment, energy ray irradiation equipment, or the like.

In addition, stick-slip does not easily occur during dismantlement, a part to be stuck to the adhesive is not easily broken, an adhesive residue does not easily remain, and workability during dismantlement becomes well. When members that are easily cracked, such as thin image display modules to be used in organic EL panels or liquid crystal panels, transparent conductive glass having a transparent conductive layer, and thin glass like panel surface-protecting glass, are fixed with an adhesive tape, if stick-slip occurs when the tape is peeled off, the peel force temporarily increases, whereby the parts are cracked easily. However, according to the adhesive tape of the present invention, even those parts that are easily cracked can be dismantled without being cracked.

DESCRIPTION OF EMBODIMENTS

Acrylic Polymer

Figure 1:
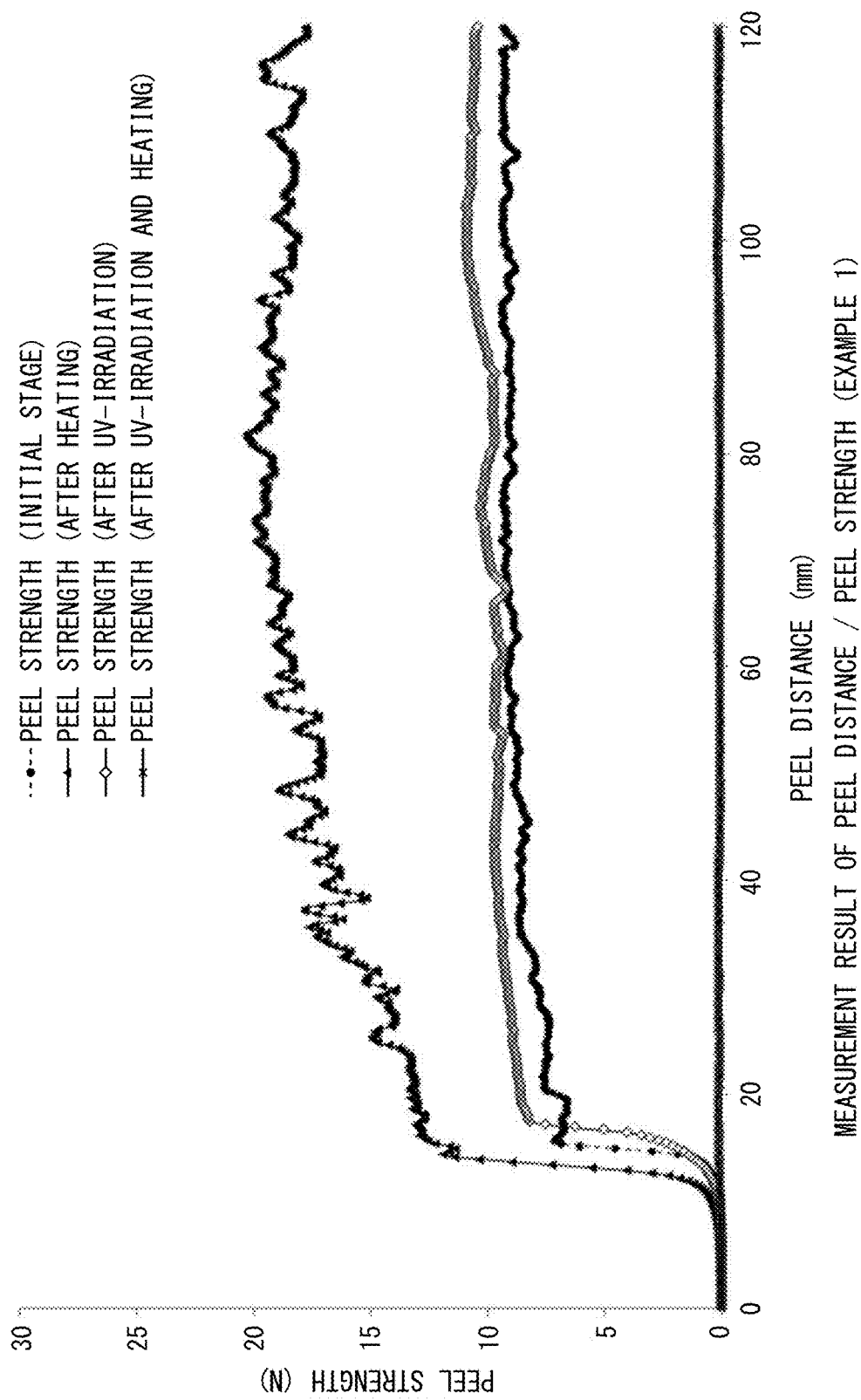
FIG. 1 is a view showing 180° peel strengths (N/20 mm) and peel distances (mm/20 mm width) measured before and after heating, measured after UV irradiation, and measured after both UV irradiation and heating in Example 1.

The acrylic polymer used in the easily dismantlable adhesive composition of the present invention is an acrylic block polymer having a poly(meth)acrylate chain (A) formed of a carboxyl precursor group-containing (meth) acrylate monomer (a) and a poly(meth)acrylate chain (B) containing, as monomer components, (meth)acrylate (b) having an alkyl group having 1 to 14 carbon atoms and a polar group-containing monomer (c).

The poly(meth)acrylate chain (A) formed of the carboxyl precursor group-containing (meth)acrylate monomer (a) is a poly(meth)acrylate chain having the carboxyl precursor group of the (meth)acrylate monomer (a) in a side chain thereof. The carboxyl precursor group of the poly(meth) acrylate chain (A) is converted into a carboxyl group by an acid catalyst or an acid component of an acid generator which generates an acid by light or heat from the outside of an adhesive layer, whereby the poly(meth)acrylate chain (A) becomes a poly(meth)acrylate chain. The poly(meth)acrylate chain increases a cohesive force of the adhesive layer and foams when (meth)acrylic acid is generated, whereby the adhesiveness of the adhesive layer is reduced. Therefore, the side chain is decomposed by the acid component produced by external stimulation, and accordingly, peeling properties of the adhesive layer are improved, and the adhesive layer can be favorably dismantled.

The carboxyl precursor group is not particularly limited as long as it is converted into a carboxyl group by an acid. However, ester groups, which are constituted with an alkyl group having a secondary or tertiary carbon atom that easily causes dissociation of an olefin by an acid and a carboxyl group, may preferably be used. Moreover, as groups other than the alkyl group having a secondary or tertiary carbon atom, benzyl groups, which can be easily dissociated under mild conditions, and the like may preferably be used. Among the carboxyl precursor groups dissociated at the time of decomposition of the side chain, groups that generate gas such as an alkylene or an alkane by the dissociation are preferable since these groups contribute to the improvement of peeling properties of the adhesive layer and make it possible to obtain better removability.

The poly(meth)acrylate chain (A) is preferably a polymer chain represented by the following Formula (1).

[Chem. 1]

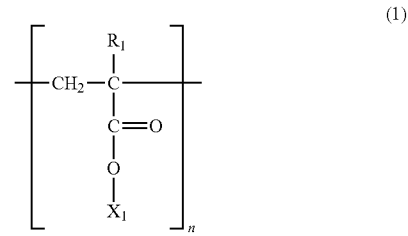

In Formula (1). $R_1$ is a hydrogen atom or a methyl group and preferably is a hydrogen atom. $X_1$ is an alkyl group (preferably having 1 to 20 carbon atoms and more preferably having 1 to 12 carbon atoms) which is dissociated by the influence of an acid and can form a carboxyl group in Formula (1). When $X_1$ is an alkyl group having a secondary or tertiary carbon atom, the secondary or tertiary carbon atom of the alkyl group binds to an oxygen atom of a (meth)acryloyloxy group. The type of $X_1$ may be different in each repeating unit as long as $X_1$ is an alkyl group that can form a carboxyl group in Formula (1) by being dissociated. However, in terms of production, a structure in which the same repeating units are continuous is preferable. If n as a number of the repeating units is 10 or greater, the side chain is decomposed by an acid catalyst or an acid component of an acid generator which generates an acid by light or heat from the outside of the adhesive layer, and this can contribute to peeling of the adhesive layer. n as a number of the repeating units is a number of polymerizable repeating units and is not particularly limited as long as the number can realize adhesion properties. However, n is preferably 10 or greater and more preferably 20 or greater, and the upper limit thereof is preferably 100,000 or less. It is preferable that n be about 100 to 10,000, particularly preferably 200 to 6,000, since particularly favorable adhesion properties are easily obtained.

Among the (meth)acrylate monomers (a) constituting the poly(meth)acrylate chain (A), as a (meth)acrylate monomer (a1-1) which is formed when a secondary carbon atom of the alkyl group having the secondary carbon atom binds to a (meth)acryloyloxy group, for example, sec-butyl (meth) acrylate, isopropyl (meth)acrylate, sec-hexyl (meth)acrylate, sec-octyl (meth)acrylate, sec-nonyl (meth)acrylate, sec-decyl (meth)acrylate, bornyl (meth)acrylate, isobornyl (meth) acrylate, or cyclohexyl (meth)acrylate may be used. Among these, cyclohexyl acrylate may preferably be used since this monomer makes it easy to obtain favorable dismantlability and a colorless adhesive layer having a high degree of transparency.

As a (meth)acrylate monomer (a1-2) which is formed when a tertiary carbon atom of the alkyl group having the tertiary carbon atom binds to a (meth)acryloyloxy group, for example, tert-butyl (meth)acrylate, tert-hexyl (meth)acrylate, tert-octyl (meth)acrylate, tert-nonyl (meth)acrylate, tert-decyl (meth)acrylate, or 2-alkyl-2-adamantyl (meth) acrylate such as 2-methyl-2-adamantyl (meth)acrylate may be used.

Moreover, as the carboxyl precursor group-containing (meth)acrylate monomer (a) other than the above, benzyl (meth)acrylate may also preferably be used.

Among these (meth)acrylate monomers (a), tert-butyl (meth)acrylate, 2-methyl-2-adamantyl (meth)acrylate, 2-ethyl-2-adamantyl (meth)acrylate, bornyl (meth)acrylate, isobornyl (meth)acrylate, cyclohexyl (meth)acrylate, or benzyl (meth)acrylate may preferably be used by being appropriately selected, since these particularly favorably form a carboxyl group by an acid. Among these, tert-butyl acrylate may particularly preferably be used. Furthermore, isobornyl acrylate may particularly preferably be used since this monomer not only can favorably form a carboxyl group by an acid but can also make it easy to obtain a colorless adhesive layer having a high degree of thermal stability and transparency.

In the adhesive composition of the present invention, monomers which make the composition be dismantled solely by heating or UV irradiation may preferably be used. However, for the use that requires adhesion stability, an adhesive composition of which the adhesive force is greatly reduced not by either heating or UV irradiation but by a combination of heating and UV irradiation is preferred in some cases. For such use, as the carboxyl precursor group-containing (meth)acrylate monomer (a), it is preferable to use the (meth)acrylate monomers exemplified above that make it easy to greatly reduce the adhesive force not by either heating or UV irradiation but by a combination of heating and UV irradiation. Among these, sec-butyl (meth)acrylate, isopropyl (meth)acrylate, cyclohexyl acrylate, isobornyl acrylate, bornyl acrylate, or tert-butyl acrylate may preferably be used.

The content of the carboxyl precursor group-containing (meth)acrylate monomer (a) is preferably 75% by mass or less based on the total monomer components constituting the acrylic polymer, since favorable adhesiveness and dismantlability can be easily realized. The content is more preferably 1 to 60% by mass, even more preferably 2 to 50% by mass, and particularly preferably 3 to 40% by mass.

The poly(meth)acrylate chain (B) constituting the acrylic polymer used in the present invention has a poly(meth)acrylate chain that contains, as monomer components, the (meth)acrylate (b) having an alkyl group having 1 to 14 carbon atoms, the (meth)acrylate (b) not being the above carboxyl precursor group-containing (meth)acrylate monomer (a), and the polar group-containing monomer (c). As a result, favorable dismantlability can be realized.

As the (meth)acrylate (b) having an alkyl group having 1 to 14 carbon atoms, for example, methyl (meth)acrylate, ethyl (meth)acrylate, n-butyl (meth)acrylate, isobutyl (meth)acrylate, hexyl (meth)acrylate, 2-ethylhexyl (meth)acrylate, n-octyl (meth)acrylate isoocyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth)acrylate, n-tridecyl (meth)acrylate, and/or n-tetradecyl (meth)acrylate may be used. Among these, it is preferable to use n-butyl (meth)acrylate and/or 2-ethylhexyl (meth)acrylate as a main monomer component, since adhesiveness of the obtained adhesive layer is improved.

If the poly(meth)acrylate chain (B) contains the (meth)acrylate monomer (b) containing an alkyl group having 1 to 14 carbon atoms as a main monomer component, favorable dismantlability can be easily realized. The content of the (meth)acrylate monomer (b) containing an alkyl group having 1 to 14 carbon atoms is preferably 50% by mass or more and more preferably 80% by mass or more, based on the monomer components constituting the poly(meth)acrylate chain (B).

It is preferable that the content of the (meth)acrylate monomer (b) be 20% by mass or more based on the total monomer components constituting the acrylic polymer, since favorable dismantlability can be easily realized. The content is more preferably 30 to 95% by mass, even more preferably 40 to 90% by mass, and particularly preferably 50 to 80% by mass.

In the present invention, if the polar group-containing monomer (c) is concurrently used as a monomer component constituting the poly(meth)acrylate chain (13), a high degree of adhesiveness can be obtained, and favorable dismantlability can be realized at the time of dismantlement. Examples of the polar group-containing monomer include vinyl monomers having a polar group such as a hydroxyl group, a carboxyl group, an amino group, an imino group, or an amide group. These monomers are preferable since they can contribute to the improvement of the adhesiveness or the cohesive force of the adhesive layer at the time of dismantlement by intermolecular interaction. Among these, polar group-containing vinyl monomers that can form a hydrogen bond may preferably be used. Particularly, hydroxyl group-containing vinyl monomers are preferable since they improve the adhesiveness and make the adhesive layer exhibit excellent temporal stability after the adhesive layer is adhered to an adherend and easily secure a cohesive force of the adhesive layer when the adhesive layer is dismantled, and in this way, these monomers contribute to the dismantlement performed at the interface between the adherend and the adhesive layer or at the interface between the adhesive layer and the substrate and to the inhibition of stick-slip, and make it easy to obtain favorable dismantlability.

As the hydroxyl group-containing monomers, for example, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 2-hydroxyhexyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate can be appropriately selected and used. Among these, 2-hydroxyethyl (meth)acrylate or 4-hydroxybutyl (meth)acrylate may preferably be used, or 2-hydroxyethyl (meth)acrylate may particularly preferably be used.

As the carboxyl group-containing vinyl monomers, for example, carboxyl group-containing monomers such as acrylic acid, methacrylic acid, itaconic acid, maleic acid, crotonic acid, an acrylic acid dimer, or ethylene oxide-modified succinate acrylate may be used.

As the amide group-containing vinyl monomers, for example, acrylamide, methacrylamide, diethyl acrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, diacetone acrylamide, or the like, may be used. As the amino group-containing vinyl monomers, for example, aminoethyl (meth)acrylate, N,N-dimethylaminoethyl (meth)acrylate, N,N-dimethylaminopropyl (meth)acrylate, or the like, may be used.

As the imino group-containing monomers, for example, cyclohexyl maleimide, isopropyl maleimide, N-cyclohexyl maleimide, itaconimide, or the like, may be used.

The content of the polar group-containing vinyl monomer is preferably 1 to 30% by mass based on the monomer components constituting the acrylic polymer, since the dismantlability becomes particularly favorable while the adhesive force is strengthened. The content is more preferably 5 to 25% by mass, and even more preferably 8 to 20% by mass. Moreover, it is preferable that the content of the polar group-containing vinyl monomer be 5% by mass or more and more preferably 8% by mass or more, since excellent high-temperature adhesiveness is easily exhibited due to the increase in the cohesive force of the adhesive layer at a high temperature, and peeling can be easily performed at an interface between the adhesive layer and an adherend or at an interface between the adhesive layer and the substrate at the time of dismantlement.

The poly(meth)acrylate chain (B) may further contain a monomer other than the (meth)acrylate (b) having an alkyl group having 1 to 14 carbon atoms and the polar group-containing monomer (c). Examples of such a monomer include styrene, vinyl acetate, and the like. Moreover, depending on the type of the production method, the poly(meth)acrylate chain (B) may contain the carboxyl precursor group-containing (meth)acrylate monomer (a). When the poly(meth)acrylate chain (B) further contains a monomer other than the (meth)acrylate (b) having an alkyl group having 1 to 14 carbon atoms and the polar group-containing monomer (c), the content of the monomer is preferably 30% by mass or less and particularly preferably 10% by mass or less, based on the monomer components forming the poly(meth)acrylate chain (B).

The acrylic polymer used in the present invention is an acrylic block copolymer of the poly(meth)acrylate chain (A) and the poly(meth)acrylate chain (B). In the present invention, the adhesive composition contains the poly(meth)acrylate chain (B), which exhibits excellent adhesiveness with respect to an adherend and gives the adhesive layer an excellent cohesive force, and the poly(meth)acrylate chain (A) in which dismantlable repeating units are continuous. Accordingly, the repeating unit, which exhibits dismantlability at the time of dismantlement while having a strong adhesive force, can favorably exerts its effects, and favorable dismantlability can be realized at the time of dismantlement without causing stick-slip. Further, the block copolymer may be a block copolymer (AB-type block copolymer) composed of one poly(meth)acrylate chain (A) and one poly(meth)acrylate chain (B), or a block copolymer (an ABA-type, a BAB-type, an ABAB-type, an ABABA-type, or the like) in which plural poly(meth)acrylate chains (A) are randomly block-polymerized with plural poly(meth)acrylate chains (B).

A weight average molecular weight of the acrylic polymer used in the present invention may be appropriately adjusted within a range of about 10,000 to 2,000,000 depending on the usage embodiment thereof. When the acrylic polymer is produced by a living radical polymerization method which will be described later, in view of maintaining favorable production efficiency, the weight average molecular weight is preferably adjusted to about 10,000 to 100,000. In view of maintaining favorable adhesive strength before dismantlement, it is preferable to adjust the weight average molecular weight to about 150,000 or more, more preferably to 300,000 or more, and particularly preferably to about 450,000 to 1,000,000. When it is particularly desired to secure the cohesive force of the adhesive layer at the time of dismantlement, the weight average molecular weight is preferably set to 600,000 or more. The number average molecular weight of the adhesive composition of the present invention is preferably 150,000 or more, since a strong adhesive force and favorable dismantlability are easily realized.

The weight average molecular weight and the number average molecular weight are values measured by Gel Permeation Chromatography (GPC) and expressed in terms of polystyrene standards. For example, they can be measured under conditions of using HLC-8220GPC (manufactured by Tosoh Corporation), TSKgel GMHXL (manufactured by Tosoh Corporation) as a column, tetrahydrofuran as an eluent, and TSK polystyrene standards as polystyrene standards, at a column temperature of 40° C. and a flow rate of 1.0 mL/min.

In order to adjust the molecular weight, a chain transfer agent may be used for polymerization. As the chain transfer agent, known chain transfer agents, for example, lauryl mercaptan, glycidyl mercaptan, mercaptoacetic acid, 2-mercaptoethanol, thioglycolic acid, 2-ethylhexyl thioglycolate, and 2,3-dimethylcapto-1-propanol may be used.

In the ratio between the poly(meth)acrylate chain (A) and the poly(meth)acrylate chain (B) contained in the acrylic polymer, it is preferable that the proportion of (A) be 75% by mole or less based on the total amount of (A) and (B). Furthermore, the copolymerization ratio represented by a molar ratio of (A)/(B) is preferably 75/25 to 1/99, more preferably 65/35 to 3/97, even more preferably 50/50 to 10/90, and particularly preferably 40/60 to 15/85. If the block copolymerization ratio is within the above range, favorable dismantlability exhibited by the poly(meth)acrylate chain (A) and the properties such as adhesiveness of the poly(meth)acrylate chain (B) are easily and favorably expressed.

The acrylic polymer may be produced by, for example, causing a radical polymerization reaction of a mixture of the acrylic monomers described above. Specific examples of methods for producing the acrylic polymer include a living radical polymerization method and conventionally known radical polymerization methods performed using an azo-based initiator or a peroxide. Among these, it is preferable to use the living radical polymerization method, since this makes it possible to inhibit the generation of low-molecular weight components and to produce an acrylic polymer having a narrow molecular weight distribution without causing a side reaction such as a chain transfer reaction or a cessation reaction in the process of radical polymerization.

Examples of the living radical polymerization method include an Atom Transfer Radical Polymerization method (ATRP method), a living radical polymerization method that uses an organic hetero-compound including elements of group 15 or 16 of a high period (a radical polymerization method using an organic hetero-compound as a mediator) (TERP method), a living radical polymerization method performed using nitroxide (NMP method), a Reversible Addition Fragmentation chain Transfer polymerization method (RAFT method), and the like.

The Atom Transfer Radical Polymerization method (ATRP method) is a method of polymerizing the acrylic monomer in the presence of, for example, a transition metal complex and an organic halide.

As the transition metal constituting the transition metal complex, for example, Cu, Ru, Fe, Rh, V, Ni, or halides of these may be used. Moreover, examples of ligands coordinated to the transition metal include bipyridyl derivatives, mercaptan derivatives, trifluorate derivatives, tertiary alkylamine derivatives, and the like.

The organic halide is a polymerization initiator, and for example, methyl 2-bromo(or chloro)propionate, ethyl 2-bromo(or chloro)propionate, methyl 2-bromo(or chloro)-2-methylpropionate, ethyl 2-bromo(or chloro)-2-methylpropionate, 1-phenylethyl chloride (or bromide), 2-hydroxyethyl 2-bromo(or chloro)propionate, 4-hydroxybutyl 2-bromo(or chloro)propionate, 2-hydroxyethyl 2-bromo(or chloro)-2-methylpropionate, and 4-hydroxybutyl 2-bromo(or chloro)-2-methylpropionate may be used.

The radical polymerization method using an organic hetero-compound as a mediator is a method in which the acrylic monomers described above are polymerized in the presence of an organic hetero-compound and a radical initiator. It is preferable to use the radical polymerization method using an organic hetero-compound as a mediator, since the molecular weight of the acrylic polymer can be easily increased, and the adhesive force can be easily improved.

As the organic hetero-compound used in the radical polymerization method using an organic hetero-compound as a mediator, an organic tellurium compound, an organic ditelluride compound, an organic bismuth compound, or an organic antimony compound may preferably be used. Specific examples of these organic hetero-compounds include known compounds such as organic tellurium compounds and organic ditelluride compounds disclosed in Japanese Unexamined Patent Application, First Publication No. 2004-323693, PCT International Publication No. WO 2004/14818, Japanese Unexamined Patent Application, First Publication No. 2006-225524, Japanese Unexamined Patent Application, First Publication No. 2006-29927, Japanese Unexamined Patent Application, First Publication No. 2006-299278, Japanese Unexamined Patent Application, First Publication No. 2008-291216, Japanese Unexamined Patent Application, First Publication No. 2009-149877, and the like; organic bismuth compounds disclosed in Japanese Unexamined Patent Application, First Publication No. 2009-149877. PCT International Publication No. WO 2006/62255, and the like; and organic antimony compounds disclosed in Japanese Unexamined Patent Application, First Publication No. 2009-149877, PCT International Publication No. WO 2006/1496, and the like, and these can be appropriately selected and used. Specific examples thereof include methyl 2-methyltellanyl-2-methylpropionate, ethyl 2-methyltellanyl-2-methylpropionate, ethyl 2-n-butyl-2-phenyltellanylpropionate, ethyl 2-methyl-2-phenyltellanylpropionate, 2-methyltellanyl propionitrile, 2-methyl-2-methyltellanyl propionitrile, (methyltellanyl-methyl)benzene, (1-methyltellanyl-ethyl)benzene, (2-methyltellanyl-propyl)benzene, (1-phenyltellanyl-ethyl)benzene, ethyl 2-methyl-2-n-butyltellanylpropionate, 2-methyl-2-dimethylbismuthanylpropionic acid methyl ester, 2-methyl-2-diphenylbismuthanylpropionitrile, 2-methyl-2-dimethylphenylbismuthanylpropionitrile, methyl 2-methyl-2-dimethylstibanylpropionate, 2-methyl-2-dimethylstibanylpropionitrile, 1-dimethylstibanyl-1-phenylethane, dimethyl ditelluride, diethyl ditelluride, di-n-propyl ditelluride, diisopropyl ditelluride, dicyclopropyl ditelluride, di-n-butyl ditelluride, di-sec-butyl ditelluride, di-tert-butyl ditelluride, dicyclobutyl ditelluride, diphenyl ditelluride, bis-(p-methoxyphenyl)ditelluride, bis-(p-aminophenyl)ditelluride, bis-(p-nitrophenyl)ditelluride, bis-(p-cyanophenyl)ditelluride, bis-(p-sulfonylphenyl)ditelluride, dinaphthyl ditelluride, dipyridyl ditelluride, and the like. Preferable examples of these include compounds such as dimethyl ditelluride, diethyl ditelluride, di-n-propyl ditelluride, di-n-butyl ditelluride, and diphenyl ditelluride.

Moreover, the acrylic polymer may be produced in the following manner for example. That is, the carboxyl precursor group-containing (meth)acrylate monomer (a) is polymerized by the radical polymerization methods described above to produce the poly(meth)acrylate chain (A) formed of a homopolymer of the (meth)acrylate monomer (a) having the carboxyl precursor group, the poly(meth)acrylate chain (B) is then produced by the same methods as described above, and the poly(meth)acrylate chains (A) and (B) are bonded to each other by a click reaction such as a cycloaddition reaction between an acetylene group and an azide group that have been introduced respectively into the (A) and (B).

[Acid Catalyst and Acid Generator]

The acid catalyst used in the present invention may be used by being appropriately selected from, for example, an aromatic sulfonic acid such as p-toluenesulfonic acid or benzenesulfonic acid, an organic acid such as an aliphatic sulfonic acid, an inorganic acid such as hydrochloric acid or sulfuric acid, and hydrates of these.

The acid generator used in the present invention is, for example, a photo-acid generator generating an acid that can initiate cationic polymerization by being irradiated with light of energy rays such as UV rays, or a thermal acid generator generating an acid by heating or the like. Among these, the photo-acid generator may particularly preferably be used since this makes it possible to favorably dismantle the adhesive layer by two types of external stimulation including light and heat, makes it difficult for the adhesive layer to be easily decomposed or dismantled when it is stored in the form of the adhesive composition or when the composition has fixed articles in the form of an adhesive tape, and makes it possible to stably maintain the storability or adhesion properties.

The photo-acid generator may be used by being appropriately selected from, for example, N-hydroxynaphthalimide trifluoromethanesulfonic acid ester, N-hydroxynaphthalimide methanesulfonic acid ester, N-hydroxynaphthalimide benzenesulfonic acid ester, N-hydroxynaphthalimide triflate, bis(cyclohexylsulfonyl)diazomethane, bis(tert-butylsulfonyl)diazomethane, bis(p-toluenesulfonyl)diazomethane, triphenylsulfonium trifluoromethane sulfonate, diphenyl-4-methylphenylsulfonium trifluoromethane sulfonate, diphenyl-2,4,6-trimethylphenylsulfonium-p-toluene sulfonate, bis(dodecylphenyl)iodonium hexafluoroantimonate, bis(tert-butylphenyl)iodonium hexafluorophosphate, bis(tert-butylphenyl)iodonium trifluoromethane sulfonate, triphenylsulfonium trifluoromethane sulfonate, biphenyliodonium trifluoromethane sulfonate, phenyl-(3-hydroxy-pentadecylphenyl)iodonium hexafluoroantimonate, and phenyl-(3-hydroxypentadecylphenyl)iodonium hexafluoroantimonate.

These photo-acid generators may be appropriately selected according to the use thereof. For example, when being mixed with an adhesive, these photo-acid generators decrease the thermal decomposition temperature in some cases. Accordingly, among these, it is preferable to use a compound having its own thermal decomposition temperature of about 150° C. or higher, such as N-hydroxynaphthalimide trifluoromethanesulfonic acid ester or bis(cyclohexylsulfonyl)diazomethane, since the compound prevents the adhesive composition from being dismantled due to an acid generated by the influence of heat at the time of storage or the like.

Moreover, among the photo-acid generators, a photo-acid generator generating gas by heating, such as bis(cyclohexylsulfonyl)diazomethane, is preferable since this compound easily realizes a particularly high degree of dismantlability by generating an acid by light and generating gas by heating. The photo-acid generator such as N-hydroxynaphthalimide trifluoromethanesulfonic acid ester that does not easily generate gas even when being heated at about 100° C. is preferable since an adhesive layer having a high degree of thermal stability can be obtained.

Further, among the photo-acid generators, photo-acid generators having a light-absorbing structure such as a benzene ring or naphthalene ring structure in the skeleton thereof are preferable since they can realize favorable dismantlability with a short light irradiation time or a small content thereof and can easily reduce the production cost or the cost of dismantlement. On the other hand, photo-acid generators not having the above light-absorbing structure may preferably be used when a photo-acid generator is required to be stable with respect to light irradiation.

As the thermal acid generator, a sulfonium salt, a benzothiazolium salt, an ammonium salt, and a phosphonium salt may be used. The thermal acid generator may be used by being appropriately selected from, for example, 4-acetoxyphenyldimethylsulfonium hexafluoroarsenate, benzyl-4-hydroxyphenylmethylsulfonium hexafluoroantimonate, 4-acetoxyphenylbenzylmethylsulfonium hexafluoroantimonate, dibenzyl-4-hydroxyphenylsulfonium hexafluoroantimonate, 4-acetoxyphenylbenzylsulfonium hexafluoroantimonate, and 3-benzylbenzothiazolium hexafluoroantimonate.

[Adhesive Composition]

The adhesive composition of the present invention contains the acrylic polymer and either an acid catalyst or an acid generator. When being stuck to an adherend, the adhesive layer formed of the adhesive composition favorably exhibits adhesion properties with respect to the adherend, mainly by the poly(meth)acrylate chain (B). Moreover, when being dismantled, the adhesive layer is heated or irradiated with light, in the presence of the acid catalyst or the acid generator which generates an acid by external stimulation such as heating or exposure to light, whereby the carboxyl precursor group on the side chain of the poly(meth) acrylate chain (A) (preferably, a secondary or tertiary carbon atom having bound to a (meth)acryloyloxy group) is decomposed, and the adhesive force is reduced. In addition, since the adhesive layer has a block-like structural unit having dismantlability described above, the dismantling effect is improved, and stick-slip caused at the time of peeling can be suppressed. For these reasons, the adhesive layer can be favorably dismantled.

The content of the acid catalyst or the acid generator in the adhesive composition may be appropriately adjusted according to the type of the acid catalyst or the acid generator to be used or to the desired dismantlability. However, the content is preferably 10% by mole or less and particularly preferably within a range of 1 to 10% by mole, based on 1 mol of the carboxyl precursor group contained in the carboxyl precursor group-containing (meth)acrylate monomer (a). Particularly, when a photo-acid generator having a light-absorbing structure is used, the content thereof is preferably about 0.1 to 5% by mole, and particularly preferably 0.1 to 3% by mole. On the other hand, when a photo-acid generator not having a light-absorbing structure is used, the content thereof is preferably about 3 to 10% by mole, and particularly preferably 4 to 8% by mole.

Regarding the content of the acid catalyst or the acid generator based on the acrylic polymer to be used, the content is preferably 15 parts by mass or less based on 100 parts by mass of the acrylic polymer. Particularly, when a photo-acid generator having a light-absorbing structure is used, the content thereof is preferably about 0.1 to 5 parts by weight, and particularly preferably 0.2 to 3 parts by weight, based on 100 parts by mass of the acrylic polymer. On the other hand, when a photo-acid generator not having a light-absorbing structure is used, the content thereof is preferably about 5 to 15 parts by weight, and particularly preferably 7 to 12 parts by weight, based on 100 parts by mass of the acrylic polymer.

The adhesive composition of the present invention is an acrylic adhesive composition containing the acrylic polymer as a main constituent, and may be an adhesive composition containing only the acrylic polymer as the acrylic polymer or an adhesive composition containing further other acrylic polymers. Moreover, the composition may optionally contain an adhesiveness-imparting resin, a crosslinking agent, other additives, and the like.

(Adhesiveness-Imparting Resin)

In the adhesive composition of the present invention, an adhesiveness-imparting resin for adjusting the strong adhesiveness of the obtained adhesive layer may be used. Examples of the adhesiveness-imparting resin used in the present invention include resins based on rosin, polymerized rosin, polymerized rosin ester, rosin phenol, stabilized rosin ester, disproportionated rosin ester, terpene, terpene phenol, petroleum, and the like.

(Solvent)

In the adhesive composition of the present invention, solvents that are generally used for adhesive compositions may be used. For example, toluene, xylene, ethyl acetate, butyl acetate, acetone, methyl ethyl ketone, or hexane may be used. Moreover, when the composition is made into an aqueous adhesive composition, water or an aqueous solvent containing water as a main component thereof may be used.

(Crosslinking Agent)

In the adhesive composition of the present invention, it is preferable to use a crosslinking agent to improve a cohesive force of the obtained adhesive layer. As the crosslinking agent, known isocyanate-based crosslinking agents, epoxy-based crosslinking agents, aziridine-based crosslinking agents, polyvalent metal salt-based crosslinking agents, metal chelate-based crosslinking agents, keto-hydrazide-based crosslinking agents, oxazoline-based crosslinking agents, carbodimide-based crosslinking agents, silane-based crosslinking agents, glycidyl(alkoxy)epoxysilane-based crosslinking agents, or the like may be used.

(Additives)

Known additives such as a base (aqueous ammonia or the like) or an acid for regulating pH, a foaming agent, a plasticizer, a softener, an antioxidant, a filler such as fiber, a balloon, or beads made of glass or plastic or metal powder, a colorant such as a pigment or a dye, a pH regulator, a film formation aid, a leveling agent, a thickener, a water repellent, or a defoaming agent may be optionally added to the adhesive composition of the present invention, within a range that does not diminish the desired effects of the present invention.

The above foaming agent may be used for promoting dismantlement of the adhesive, and for example, an inorganic foaming agent, an organic foaming agent, or swellable and expandable hollow spheres that undergo volume expansion by heating may be used.

[Easily Dismantlable Adhesive Tape]

The easily dismantlable adhesive tape of the present invention is an adhesive tape having an adhesive layer formed of the adhesive composition described above. The adhesive layer may be a single-layered adhesive layer or may have a multi-layered structure consisting of multiple adhesive layers. Furthermore, the tape may be an adhesive tape having a substrate, or in the form of an adhesive tape constituted only with an adhesive layer without a substrate. In addition, the tape may be in the form having an adhesive layer only on one surface of a substrate, or in the form of a double-sided adhesive tape having adhesive layers on both surfaces of a substrate. For fixing two or more members, the adhesive tape constituted only with an adhesive layer or the double-sided adhesive tape may preferably be used.

Examples of the substrate include plastic films made of polyolefin (for example, polypropylene or polyethylene), polyester (for example, polyethylene terephthalate or polyethylene naphthalate), polystyrene, ABS, polycarbonate, a polyimide film, polyvinyl chloride, nylon, polyvinyl alcohol, and the like, non-woven cloth made of pulp, rayon, Manila hemp, acrylonitrile, nylon, polyester, and the like, paper, cloth, metal foil, and the like. The polyester film or non-woven cloth may preferably be used, since this makes removability easily compatible with adhesiveness.

Moreover, for the purpose of improving adhesiveness between the substrate and the adhesive layer, corona treatment, plasma treatment, anchor coating treatment, or the like may be performed on one side or both sides of the substrate.

When the easily dismantlable adhesive tape of the present invention has a substrate, the tape may be produced by a direct coating method in which an adhesive composition is directly coated onto a substrate by using a roll coater, a die coater, or the like, and then the resultant is subjected to a drying process and pasted to a separator, or by a transfer method in which an adhesive composition is coated onto a separator, and then the resultant is subjected to a drying process and transferred to a substrate. When the tape does not have a substrate, the tape may be produced by a method in which an adhesive composition is coated onto a separator, and then the resultant is pasted to another separator.

In order to obtain the easily dismantlable adhesive tape of the present invention, the easily dismantlable adhesive composition is coated onto a PET film having a thickness of 50 μm by using an applicator with a gap of 8 milli-inches, the film is then dried to form an adhesive tape. The tape is then bonded onto an SUS plate in an environment of 23° C. and 50% RH by being pressed with a hand roller weighing 2 kg that reciprocates once and allowed to stand for 1 hour. Thereafter, the tape is peeled off in the 180° direction by using a tensile tester at a rate of 30 mm/min. At this time, it is preferable for the adhesive force to be 1 N/20 mm or stronger, more preferably 2 to 30 N/20 mm, and particularly preferably 3 to 20 N/20 mm. The easily dismantlable adhesive tape of the present invention can realize favorable dismantlability even if the tape has a strong adhesive force suitable for fixing parts to each other.

(Method of Dismantlement)

When being stuck to an adherend, the easily dismantlable adhesive tape of the present invention favorably adheres to the adherend or fixes parts to each other. Moreover, when being dismantled or peeled, the tape can be favorably peeled by external stimulation such as heat or light. The external stimulation such as heat or light may be appropriately adjusted according to the type of the acid catalyst or the acid generator used. However, it is preferable that the tape can be peeled under the conditions of heat or light at such a temperature or intensity that are not caused when the tape is used in a usual way such as sticking.

When the easily dismantlable adhesive tape of the present invention contains an acid catalyst, a dissociation reaction of the carboxyl precursor group is accelerated by heating, and fluidity of the adhesive layer increases, whereby acids favorably diffuse into the adhesive layer, and the adhesive tape can be favorably dismantled. Moreover, when the tape contains an acid generator generating an acid by heat or light, an acid is generated by performing light irradiation or heating, whereby the adhesive tape can be favorably dismantled. However, if heating or the like is optionally further performed in the presence of the acid, the dissociation reaction of the carboxyl precursor group is further accelerated, or diffusion of the acid is caused by the increase in fluidity of the adhesive layer, whereby the adhesive tape can be dismantled better. Particularly, in the present invention, it is preferable that a photo-acid generator be used and irradiation with light such as UV rays be performed to generate an acid that can dismantle the adhesive, and then heating be performed to efficiently dismantle the adhesive due to the acid.

The intensity of light such as UV rays may be equal to or higher than that of the energy by which the used photo-acid generator favorably generates an acid. Moreover, heating may be performed at a temperature equal to or higher than a temperature at which the used thermal acid generator favorably generates an acid. Further, the temperature of heating performed in the presence of an acid may be adjusted to a temperature which can increase fluidity of the adhesive layer based on a glass transition temperature of the adhesive composition and cause the acid to effectively diffuse, or a temperature which can accelerate a dissociation reaction of the carboxyl precursor group and efficiently decompose the side chain.

The easily dismantlable adhesive tape of the present invention has removability by which the tape can be easily dismantled by external stimulation such as heat or light, when adhesion defectiveness is caused in a working process, or when members are separated from each other for recycling. Therefore, the easily dismantlable adhesive tape may preferably be used as an adhesive tape for fixing parts of various products to each other, for industrial use including automobiles, building materials, OA, the home appliance industry, and the like. Particularly, when members that are easily cracked, such as thin image display modules used in organic EL panels or liquid crystal panels, transparent conductive glass having a transparent conductive layer, and thin glass such as a panel surface-protecting glass, are fixed with an adhesive tape, if stick-slip occurs when the tape is peeled off the peel force temporarily increases, whereby the parts are cracked easily. However, according to the adhesive tape of the present invention, even those parts that are easily cracked can be dismantled without being cracked. Moreover, the adhesive tape can be excellently dismantled in a short time, and as a result, work efficiency becomes well even when defectiveness is caused in the process of working, a large amount of parts are separated for recycling, or a large amount of labels are peeled.

EXAMPLES

Production Example 1

Synthesis of poly-t-butyl acrylate (1): A mixture solution composed of 1.15 mg of 2,2'-azobis(4-methoxy-2,4-dimethylvaleronitrile) (AMVN), 1.48 g of t-butyl acrylate (tBA), and 2.95 g of ethyl acetate was put in a test tube, followed by deaeration for 30 minutes by argon gas bubbling. 4.25 μL of an organic monotellurium compound was added to the test tube by using a microsyringe, and the mixture was reacted for 2 hours in an oil bath at 50° C., thereby obtaining a reaction solution of a poly-t-butyl acrylate (1). The degree of polymerization thereof measured by $^1$H-NMR (300 MHz) analysis was 74%. Moreover, by GPC analysis, results of Mn=68,600 and PD (Mw/Mn)=1.32 were obtained.

Synthesis of acrylic block copolymer (1): A mixture solution composed of 5.76 g of n-butyl acrylate (nBA) and 0.23 g of 2-hydroxyethyl acrylate (HEA), which had undergone argon gas bubbling for 30 minutes, was added to the reaction solution of the poly-t-butyl acrylate (1) obtained as above, and the mixture was reacted for 12 hours at 50° C.

The degree of polymerization of t-butyl acrylate, n-butyl acrylate, and 2-hydroxyethyl acrylate was confirmed to be 90%, 60%, and 62% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (1) formed of a poly-t-butyl acrylate chain and a polyacrylate chain which was formed of other copolymerization components. By GPC analysis, results of Mn=239,200, Mw=354,000, and PD=1.48 were obtained. A mass ratio among the constituents of the copolymer was tBA/nBA/HEA=29.2/67.2/3.6.

Production Example 2

Synthesis of poly-t-butyl acrylate (2): A mixture solution composed of 1.21 mg of 2,2'-azobis(4-methoxy-2,4-dimethylvaleronitrile) (AMVN), 1.33 g of t-butyl acrylate, and 2.66 g of ethyl acetate was put in a test tube, followed by deaeration for 30 minutes by argon gas bubbling. 4.49 μL of an organic monotellurium compound was added to the test tube by using a microsyringe, and the mixture was reacted for 2 hours in an oil bath at 50° C., thereby obtaining a reaction solution of a poly-t-butyl acrylate (2). The degree of polymerization thereof measured by $^1$H-NMR (300 MHz) analysis was 79%. Moreover, by GPC analysis, results of Mn=73,800 and PD=1.26 were obtained.

Synthesis of acrylic block copolymer (2): A mixture solution composed of 5.90 g of n-butyl acrylate and 1.16 g of 2-hydroxyethyl acrylate, which had undergone argon gas bubbling for 30 minutes, was added to the reaction solution of the poly-t-butyl acrylate (2) obtained as above, and the mixture was reacted for 3 hours at 50° C. The degree of polymerization of t-butyl acrylate, 2-ethylhexyl acrylate, and n-butyl acrylate was confirmed to be 90%, 42%, and 49% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (2). By GPC analysis, results of Mn=266,300, Mw=570,000, and PD=2.14 were obtained. A mass ratio among the constituents of the copolymer was tBA/nBA/HEA=33.2/53.1/13.7.

Production Example 3

Synthesis of poly-t-butyl acrylate (3): A mixture solution composed of 0.93 mg of 2,2'-azobis(4-methoxy-2,4-dimethylvaleronitrile) (AMVN), 1.71 g of t-butyl acrylate, and 3.42 g of ethyl acetate was put in a test tube, followed by deaeration for 30 minutes by argon gas bubbling. 3.43 μL of an organic monotellurium compound was added to the test tube by using a microsyringe, and the mixture was reacted for 2 hours in an oil bath at 50° C., thereby obtaining a reaction solution of a poly-t-butyl acrylate (3). The degree of polymerization thereof measured by $^1$H-NMR (300 MHz) analysis was 76%. Moreover, by GPC analysis, results of Mn=93,200 and PD=1.30 were obtained.

Synthesis of acrylic block copolymer (3): 5.66 g of 2-ethylhexyl acrylate (2EHA) and 0.23 g of 2-hydroxyethyl acrylate, which had undergone argon gas bubbling for 30 minutes, were added to the reaction solution of the poly-t-butyl acrylate (3) obtained as above, and the mixture was reacted for 4 hours at 50° C. The degree of polymerization of t-butyl acrylate, 2-ethylhexyl acrylate, and 2-hydroxyethyl acrylate was confirmed to be 87%, 46%, and 52% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (3). By GPC analysis, results of Mn=257,800, Mw=383,000, and PD=1.49 were obtained. A mass ratio among the constituents of the copolymer was tBA/2EHA/HEA=35.3/61.5/3.2.

Production Example 4

Synthesis of poly-t-butyl acrylate (4): A mixture solution composed of 0.86 mg of 2,2'-azobis(4-methoxy-2,4-dimethylvaleronitrile) (AMVN), 1.46 g of t-butyl acrylate, and 1.46 g of ethyl acetate was put in a test tube, followed by deaeration for 30 minutes by argon gas bubbling. 3.19 μL of an organic monotellurium compound was added to the test tube by using a microsyringe, and the mixture was reacted for 2 hours in an oil bath at 50° C., thereby obtaining a reaction solution of a poly-t-butyl acrylate (4). The degree of polymerization thereof measured by $^1$H-NMR (300 MHz) analysis was 79%. Moreover, by GPC analysis, results of Mn=73,800 and PD=1.28 were obtained.

Synthesis of acrylic block copolymer (4): A mixture solution composed of 4.48 g of 2-ethylhexyl acrylate, 0.82 g of 2-hydroxyethyl acrylate, and 5.30 g of ethyl acetate, which had undergone argon gas bubbling for 30 minutes, was added to the reaction solution of the poly-t-butyl acrylate (4) obtained as above, and the mixture was reacted for 7 hours at 50° C. The degree of polymerization of t-butyl acrylate, 2-ethylhexyl acrylate, and 2-hydroxyethyl acrylate was confirmed to be 82%, 49%, and 58% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (4). By GPC analysis, results of Mn=265, 000, Mw=462,000, and PD=1.74 were obtained. A mass ratio among the constituents of the copolymer was tBA/2EHA/HEA=29.0/56.9/14.1.

Production Example 5

A mixture solution composed of 1.23 mg of 2,2'-azobis(4-methoxy-2,4-dimethylvaleronitrile) (AMVN), 1.89 g of t-butyl acrylate, 3.29 g of n-butyl acrylate, 0.16 g of 2-hydroxyethyl acrylate, and 2.05 g of ethyl acetate was put in a test tube, followed by deaeration for 30 minutes by argon gas bubbling. 4.55 µL of an organic monotellurium compound was added to the test tube by using a microsyringe, and the mixture was reacted for 5 hours in an oil bath at 50° C. The degree of polymerization of t-butyl acrylate, n-butyl acrylate, and 2-hydroxyethyl acrylate was confirmed to be 91%, 90%, and 90% respectively by $^1$H-NMR (300 MHz) analysis. After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic random copolymer (1). By GPC analysis, results of Mn=277,100, Mw=463,000, and PD=1.67 were obtained. A mass ratio among the constituents of the copolymer was tBA/nBA/HEA=35.5/61.1/3.4.

Production Example 6

A mixture solution composed of 0.96 mg of 2,2'-azobis(4-methoxy-2,4-dimethylvaleronitrile) (AMVN), 1.89 g of t-butyl acrylate, 3.11 g of n-butyl acrylate, 0.65 g of 2-hydroxyethyl acrylate, and 5.65 g of ethyl acetate was put in a test tube, followed by deaeration for 30 minutes by argon gas bubbling. 3.56 µL of an organic monotellurium compound was added to the test tube by using a microsyringe, and the mixture was reacted for 4 hours in an oil bath at 50° C. The degree of polymerization of t-butyl acrylate, n-butyl acrylate, and 2-hydroxyethyl acrylate was confirmed to be 77%, 76%, and 79% respectively by $^1$H-NMR (300 MHz) analysis. After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic random copolymer (2). By GPC analysis, results of Mn=253,400, Mw=475,000, and PD=1.88 were obtained. A mass ratio among the constituents of the copolymer was tBA/nBA/HEA=33.5/53.7/12.8.

Production Example 7

A mixture solution composed of 0.49 mg of 2,2'-azobis(4-methoxy-2,4-dimethylvaleronitrile) (AMVN), 1.00 g of t-butyl acrylate (tBA), 1.63 g of 2-ethylhexyl acrylate (2EHA), 0.40 g of 2-hydroxyethyl acrylate (HEA), and 3.01 g of ethyl acetate was put in a test tube, followed by deaeration for 30 minutes by argon gas bubbling. 1.83 µL of an organic monotellurium compound was added to the test tube by using a microsyringe, and the mixture was reacted for 2 hours in an oil bath at 50° C. The degree of polymerization of t-butyl acrylate, 2-ethylhexyl acrylate, and 2-hydroxyethyl acrylate was confirmed to be 77%, 73%, and 81% respectively by $^1$H-NMR (3 MHz) analysis.

After the reaction ended, the polymerized solution was diluted with 20 mL of chloroform, poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic random copolymer (3). By GPC analysis, results of Mn=285,700, Mw=580,300, and PD=2.03 were obtained. A mass ratio among the constituents of the copolymer was tBA/2EHA/HEA=33.2/51.9/14.9.

Production Example 8

Synthesis of polycyclohexyl acrylate (1): A mixture solution composed of 2.39 mg of 2,2'-azobis(4-methoxy-2,4-dimethylvaleronitrile) (AMVN), 0.39 mg of 2,2'-azobis(isobutyronitrile) (AIBN), 2.28 mg of diphenyl ditelluride (DPDT), 1.30 g of cyclohexyl acrylate (CHA), and 2.60 g of anisole was put in a test tube, followed by deaeration for 30 minutes by argon gas bubbling. The mixture was reacted for 4 hours in an oil bath at 60° C., thereby obtaining a reaction solution of polycyclohexyl acrylate (1). The degree of polymerization thereof measured by $^1$H-NMR (300 MHz) analysis was 43%. Moreover, by GPC analysis, results of Mn=40,000 and PD=1.50 were obtained.

Synthesis of acrylic block copolymer (5): A mixture solution composed of 4.17 g of 2-ethylhexyl acrylate (2EHA) and 1.07 g of 2-hydroxyethyl acrylate (HEA), which had undergone argon gas bubbling for 30 minutes, was added to the reaction solution of the polycyclohexyl acrylate (1) obtained as above, and the mixture was reacted for 18 hours at 60° C. The degree of polymerization of cyclohexyl acrylate, 2-ethylhexyl acrylate, and 2-hydroxyethyl acrylate was confirmed to be 46%, 16%, and 22% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (5) formed of a cyclohexyl acrylate chain and a polyacrylate chain which was formed of other copolymerization components. By GPC analysis, results of Mn=95,000, Mw=216,600, and PD=2.28 were obtained. A mass ratio among the constituents of the copolymer was CHA/2EHA/HEA=40.2/40.9/18.9.

Production Example 9

Synthesis of poly-t-butyl acrylate (5): A mixture solution composed of 0.74 mg of 2,2'-azobis(4-methoxy-2,4-dimethylvaleronitrile) (AMVN), 1.28 g of t-butyl acrylate (tBA), and 2.55 g of ethyl acetate was put in a test tube, followed by deaeration for 30 minutes by argon gas bubbling. 2.74 μL of an organic monotellurium compound was added to the test tube by using a microsyringe, and the mixture was reacted for 2 hours in an oil bath at 50° C., thereby obtaining a reaction solution of a poly-t-butyl acrylate (5). The degree of polymerization thereof measured by $^1$H-NMR (300 MHz) analysis was 69%. Moreover, by GPC analysis, results of Mn=65,600 and PD=1.29 were obtained.

Synthesis of acrylic block copolymer (6): A mixture solution composed of 4.33 g of 2-ethylhexyl acrylate (2EHA) and 0.47 g of 2-hydroxyethyl acrylate (HEA), which had undergone argon gas bubbling for 30 minutes, was added to the reaction solution of the poly-t-butyl acrylate (5) obtained as above, and the mixture was reacted for 4 hours at 50° C. The degree of polymerization of t-butyl acrylate, 2-ethylhexyl acrylate, and 2-hydroxyethyl acrylate was confirmed to be 83%, 42%, and 49% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (6) formed of a poly-t-butyl acrylate chain and a polyacrylate chain which was formed of other copolymerization components. By GPC analysis, results of Mn=187,900, Mw=268,200, and PD=1.43 were obtained. A mass ratio among the constituents of the copolymer was tBA/2EHA/HEA=33.5/58.4/8.1.

Production Example 10

Synthesis of poly-t-butyl acrylate (6): A mixture solution composed of 0.68 mg of 2,2'-azobis(4-methoxy-2,4-dimethylvaleronitrile) (AMVN), 1.31 g of t-butyl acrylate (tBA), and 2.61 g of ethyl acetate was put in a test tube, followed by deaeration for 30 minutes by argon gas bubbling. 2.53 μL of an organic monotellurium compound was added to the test tube by using a microsyringe, and the mixture was reacted for 2.5 hours in an oil bath at 50° C., thereby obtaining a reaction solution of a poly-t-butyl acrylate (6). The degree of polymerization thereof measured by $^1$H-NMR (300 MHz) analysis was 68%. Moreover, by GPC analysis, results of Mn=73,700 and PD=1.28 were obtained.

Synthesis of acrylic block copolymer (7): A mixture solution composed of 4.45 g of 2-ethylhexyl acrylate (2EHA) and 0.36 g of 2-hydroxyethyl acrylate (HEA), which had undergone argon gas bubbling for 30 minutes, was added to the reaction solution of the poly-t-butyl acrylate (6) obtained as above, and the mixture was reacted for 4 hours at 50° C. The degree of polymerization of t-butyl acrylate, 2-ethylhexyl acrylate, and 2-hydroxyethyl acrylate was confirmed to be 85%, 45%, and 50% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (7) formed of a poly-t-butyl acrylate chain and a polyacrylate chain which was formed of other copolymerization components. By GPC analysis, results of Mn=203,600, Mw=302,900, and PD=1.49 were obtained. A mass ratio among the constituents of the copolymer was tBA/2EHA/HEA=32.9/61.3/5.8.

Production Example 11

Synthesis of poly-t-butyl acrylate (7): A mixture solution composed of 0.97 mg of 2,2'-azobis(4-methoxy-2,4-dimethylvaleronitrile) (AMVN), 1.67 g of t-butyl acrylate (tBA), and 3.34 g of ethyl acetate was put in a test tube, followed by deaeration for 30 minutes by argon gas bubbling. 3.59 μL of an organic monotellurium compound was added to the test tube by using a microsyringe, and the mixture was reacted for 2 hours in an oil bath at 50° C., thereby obtaining a reaction solution of a poly-t-butyl acrylate (7). The degree of polymerization thereof measured by $^1$H-NMR (300 MHz) analysis was 73%. Moreover, by GPC analysis, results of Mn=61,900 and PD=1.26 were obtained.

Synthesis of acrylic block copolymer (8): A mixture solution composed of 5.66 g of 2-ethylhexyl acrylate (2EHA) and 0.62 g of 2-hydroxyethyl acrylate (HEA), which had undergone argon gas bubbling for 30 minutes, was added to the reaction solution of the poly-t-butyl acrylate (7) obtained as above, and the mixture was reacted for 6 hours at 50° C. The degree of polymerization of t-butyl acrylate, 2-ethylhexyl acrylate, and 2-hydroxyethyl acrylate was confirmed to be 81%, 34%, and 42% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum fir 10 hours at 40° C. under reduced pressure, thereby obtaining an acrylic block copolymer (8) formed of a poly-t-butyl acrylate chain and a polyacrylate chain which was formed of other copolymerization components. By GPC analysis, results of Mn=140,200, Mw=196,400, and PD=1.40 were obtained. A mass ratio among the constituents of the copolymer was tBA/2EHA/HEA=38.5/54.0/7.6.

Production Example 12

Synthesis of poly-t-butyl acrylate (8): A mixture solution composed of 0.73 mg of 2,2'-azobis(4-methoxy-2,4-dimethylvaleronitrile) (AMVN), 0.82 g of t-butyl acrylate (tBA), and 1.64 g of ethyl acetate was put in a test tube, followed by deaeration for 30 minutes by argon gas bubbling. 2.71 μL of an organic monotellurium compound was added to the test tube by using a microsyringe, and the mixture was reacted for 2 hours in an oil bath at 50° C., thereby obtaining a reaction solution of a poly-t-butyl acrylate (8). The degree of polymerization thereof measured by $^1$H-NMR (300 MHz) analysis was 72%. Moreover, by GPC analysis, results of Mn=43,100 and PD=1.26 were obtained.

Synthesis of acrylic block copolymer (9): A mixture solution composed of 5.20 g of 2-ethylhexyl acrylate (2EHA) and 0.96 g of 2-hydroxyethyl acrylate (HEA), which had undergone argon gas bubbling for 30 minutes, was added to the reaction solution of the poly-t-butyl acrylate (8) obtained as above, and the mixture was reacted for 4 hours at 50° C. The degree of polymerization of t-butyl acrylate, 2-ethylhexyl acrylate, and 2-hydroxyethyl acrylate was confirmed to be 81%, 46%, and 57% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (9) formed of a poly-t-butyl acrylate chain and a polyacrylate chain which was formed of other copolymerization components. By GPC analysis, results of Mn=215,000, Mw=357,500, and PD=1.66 were obtained. A mass ratio among the constituents of the copolymer was tBA/2EHA/HEA=17.0/66.5/16.5.

Production Example 13

Synthesis of poly-t-butyl acrylate (9): A mixture solution composed of 0.77 mg of 2,2'-azobis(4-methoxy-2,4-dimethylvaleronitrile) (AMVN), 0.35 g of t-butyl acrylate (tBA), and 1.40 g of ethyl acetate was put in a test tube, followed by deaeration for 30 minutes by argon gas bubbling. 2.84 μL of an organic monotellurium compound was added to the test tube by using a microsyringe, and the mixture was reacted for 2 hours in an oil bath at 50° C., thereby obtaining a reaction solution of a poly-t-butyl acrylate (9). The degree of polymerization thereof measured by $^1$H-NMR (300 MHz) analysis was 50%. Moreover, by GPC analysis, results of Mn=15,700 and PD=1.21 were obtained.

Synthesis of acrylic block copolymer (10): A mixture solution composed of 6.13 g of 2-ethylhexyl acrylate (2EHA) and 1.28 g of 2-hydroxyethyl acrylate (HEA), which had undergone argon gas bubbling for 30 minutes, was added to the reaction solution of the poly-t-butyl acrylate (9) obtained as above, and the mixture was reacted for 6 hours at 50° C. The degree of polymerization of t-butyl acrylate, 2-ethylhexyl acrylate, and 2-hydroxyethyl acrylate was confirmed to be 62%, 42%, and 58% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (10) formed of a poly-t-butyl acrylate chain and a polyacrylate chain which was formed of other copolymerization components. By GPC analysis, results of Mn=253,000, Mw=394,700, and PD=1.56 were obtained. A mass ratio among the constituents of the copolymer was tBA/2EHA/HEA=3.9/72.9/23.3.

Production Example 14

Synthesis of poly-t-butyl acrylate (10): A mixture solution composed of 2.28 mg of 2,2'-azobis(4-methoxy-2,4-dimethylvaleronitrile) (AMVN), 0.89 mg of 2,2'-azobis(isobutyronitrile) (AIBN), 2.16 mg of diphenyl ditelluride (DPDT), 1.30 g of t-butyl acrylate (tBA), and 2.60 g of ethyl acetate was put in a test tube, followed by deaeration for 30 minutes by argon gas bubbling. The mixture was reacted for 2.5 hours in an oil bath at 60° C., thereby obtaining a reaction solution of a poly-t-butyl acrylate (10). The degree of polymerization thereof measured by $^1$H-NMR (300 MHz) analysis was 64%. Moreover, by GPC analysis, results of Mn=61,500 and PD=1.58 were obtained.

Synthesis of acrylic block copolymer (11): A mixture solution composed of 4.29 g of 2-ethylhexyl acrylate (2EHA) and 0.27 g of 2-hydroxyethyl acrylate (HEA), which had undergone argon gas bubbling for 30 minutes, was added to the reaction solution of the poly-t-butyl acrylate (10) obtained as above, and the mixture was reacted for 3 hours at 60° C. The degree of polymerization of t-butyl acrylate, 2-ethylhexyl acrylate, and 2-hydroxyethyl acrylate was confirmed to be 83%, 49%, and 63% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (11) formed of a poly-t-butyl acrylate chain and a polyacrylate chain which was formed of other copolymerization components. By GPC analysis, results of Mn=204,000, Mw=371,300, and PD=1.82 were obtained. A mass ratio among the constituents of the copolymer was tBA/2EHA/HEA=29.5/64.4/6.1.

Production Example 15

Synthesis of poly-t-butyl acrylate (11): A mixture solution composed of 0.76 mg of 2,2'-azobis(4-methoxy-2,4-dimethylvaleronitrile) (AMVN), 1.32 g of t-butyl acrylate (tBA), and 2.63 g of ethyl acetate was put in a test tube, followed by deaeration for 30 minutes by argon gas bubbling. 2.80 μL of an organic monotellurium compound was added to the test tube by using a microsyringe, and the mixture was reacted for 2 hours in an oil bath at 50° C., thereby obtaining a reaction solution of a poly-t-butyl acrylate (11). The degree of polymerization thereof measured by $^1$H-NMR (300 MHz) analysis was 63%. Moreover, by GPC analysis, results of Mn=55,700 and PD=1.31 were obtained.

Synthesis of acrylic block copolymer (12): A mixture solution composed of 4.86 g of n-butyl acrylate (nBA) and 0.61 g of 2-hydroxyethyl acrylate (HEA), which had undergone argon gas bubbling for 30 minutes, was added to the reaction solution of the poly-t-butyl acrylate (11) obtained as above, and the mixture was reacted for 5 hours at 50° C. The degree of polymerization of t-butyl acrylate, n-butyl acrylate, and 2-hydroxyethyl acrylate was confirmed to be 75%, 41%, and 48% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (12) formed of a poly-t-butyl acrylate chain and a polyacrylate chain which was formed of other copolymerization components. By GPC analysis, results of Mn=190,000. Mw=304,000, and PD=1.60 were obtained. A mass ratio among the constituents of the copolymer was tBA/nBA/HEA=28.2/61.4/10.4.

Production Example 16

Synthesis of poly-t-butyl acrylate (12): A mixture solution composed of 0.74 mg of 2,2'-azobis(4-methoxy-2,4-dimethylvaleronitrile) (AMVN), 1.26 g of t-butyl acrylate (tBA), and 2.52 g of ethyl acetate was put in a test tube, followed by deaeration for 30 minutes by argon gas bubbling. 2.75 μL of an organic monotellurium compound was added to the test tube by using a microsyringe, and the mixture was reacted for 2.5 hours in an oil bath at 50° C., thereby obtaining a reaction solution of a poly-t-butyl acrylate (12). The degree of polymerization thereof measured by $^1$H-NMR (300 MHz) analysis was 75%. Moreover, by GPC analysis, results of Mn=68,600 and PD=1.28 were obtained.

Synthesis of acrylic block copolymer (13): A mixture solution composed of 4.23 g of 2-ethylhexyl acrylate (2EHA) and 1.16 g of 4-hydroxybutyl acrylate (HBA), which had undergone argon gas bubbling for 30 minutes, was added to the reaction solution of the poly-t-butyl acrylate (12) obtained as above, and the mixture was reacted for 3 hours at 50° C. The degree of polymerization of t-butyl acrylate, 2-ethylhexyl acrylate, and 4-hydroxybutyl acrylate was confirmed to be 86%, 44%, and 46% respectively by $^1$H-NMR (300 MHz) analysis.

After the reaction ended, the polymerized solution was poured into a mixture of methanol and water (volume fraction of methanol:water=80:20) to precipitate a polymer, and the supernatant liquid was removed by decantation. The obtained precipitate was dissolved in 50 mL of chloroform and poured into a mixture of methanol and water (volume fraction of methanol:water=80:20) to reprecipitate the polymer. The supernatant liquid was removed by decantation, and then the resultant was dried in a vacuum for 10 hours at 40° C. under reduced pressure, thereby obtaining an acrylic block copolymer (13) formed of a poly-t-butyl acrylate chain and a polyacrylate chain which was formed of other copolymerization components. By (GPC analysis, results of Mn=192,500, Mw=321,600, and PD=1.67 were obtained. A mass ratio among the constituents of the copolymer was tBA/2EHA/HBA=30.3/53.6/16.1.

Example 1

N-hydroxynaphthalimide triflate (NIT) as a photo-acid generator was added to the acrylic block copolymer (1) obtained in Production example 1, in an amount of 0.4% by mole based on the t-butyl group in the acrylic block copolymer (1), and the resultant was diluted with acetone, thereby obtaining 15% by weight of an acetone solution as an adhesive composition. The obtained adhesive composition was coated onto a PET film having a thickness of 50 μm, by using an applicator with a gap of 8 milli-inches, and the film was dried under reduced pressure for 12 hours to form an adhesive sheet. The dismantlability of the formed adhesive sheet was evaluated according to the following Dismantlability test 1. The obtained results are shown in Table 1 and FIG. 1.

Example 2

Figure 2:
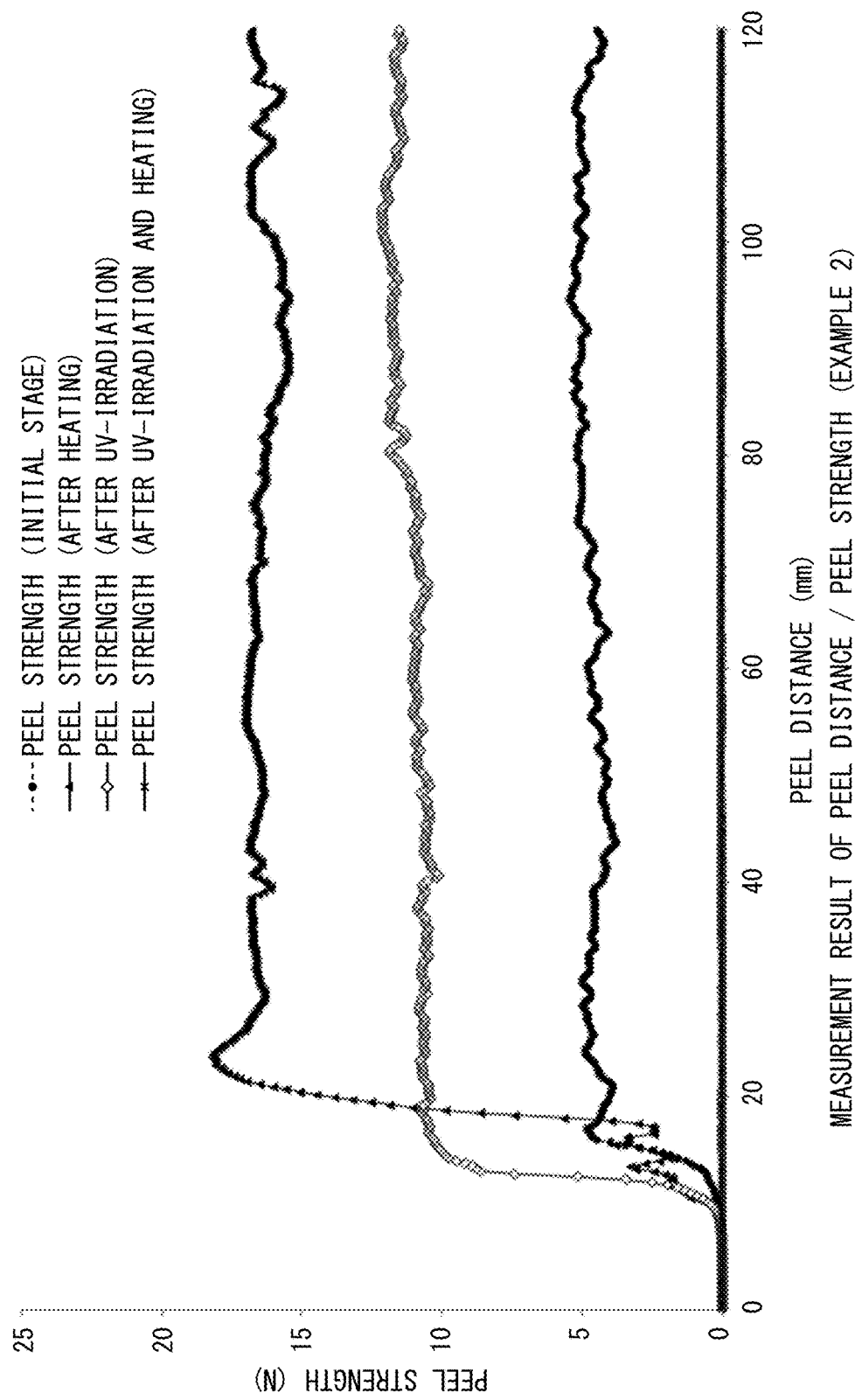
FIG. 2 is a view showing 180° peel strengths (N/20 mm) and peel distances (mm/20 mm width) measured before and after heating, measured after UV irradiation, and measured after both UV irradiation and heating in Example 2.

An adhesive composition was prepared in the same manner as in Example 1, except that the acrylic block copolymer (2) obtained in Production example 2 was used instead of the acrylic block copolymer (1). The obtained adhesive composition was formed into an adhesive sheet in the same manner as in Example 1, and the dismantlability thereof was evaluated. The obtained results are shown in Table 1 and FIG. 2.

Example 3

Figure 3:
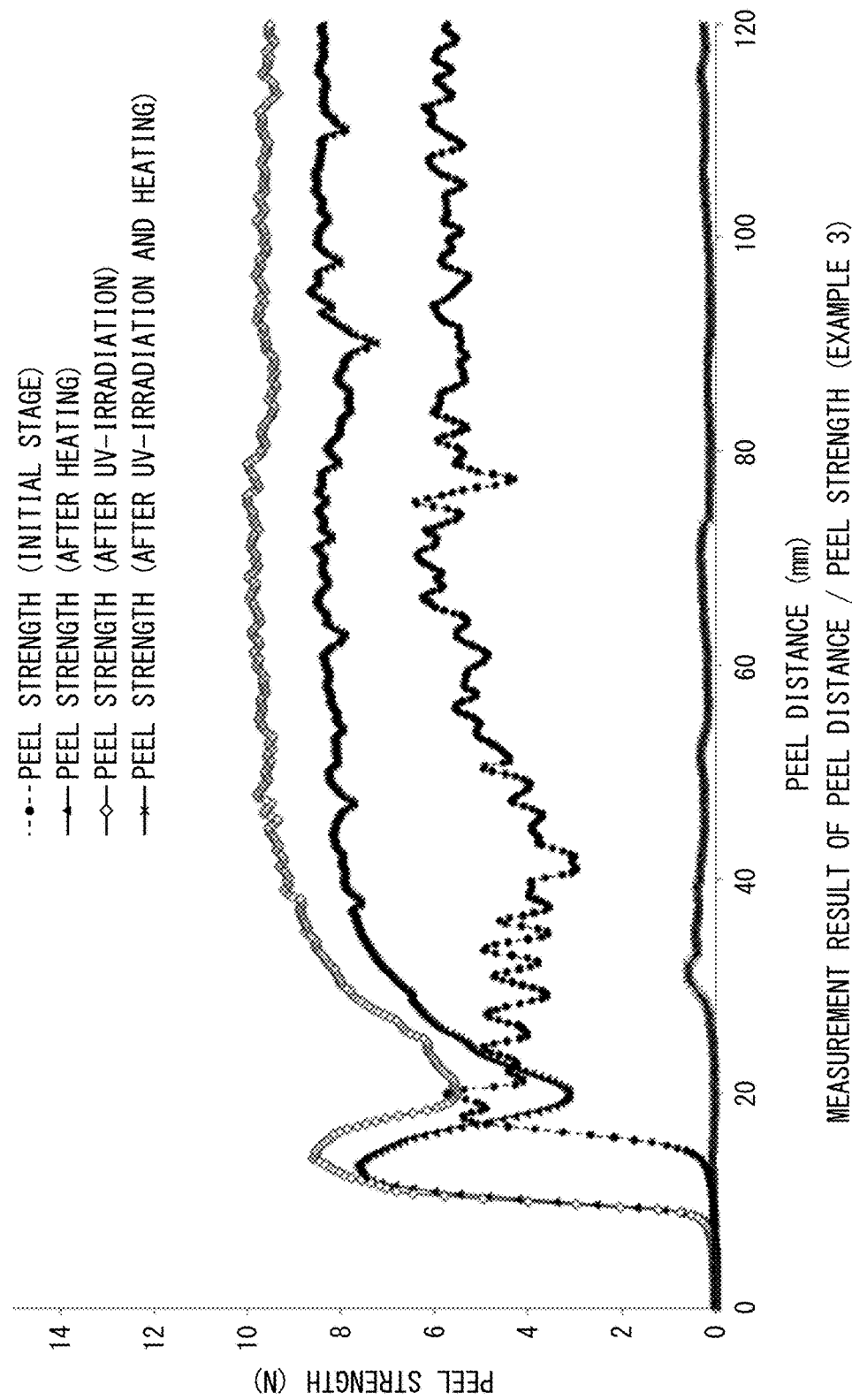
FIG. 3 is a view showing 180° peel strengths (N/20 mm) and peel distances (mm/20 mm width) measured before and after heating, measured after UV irradiation, and measured after both UV irradiation and heating in Example 3.

An adhesive composition was prepared in the same manner as in Example 1, except that the acrylic block copolymer (3) obtained in Production example 3 was used instead of the acrylic block copolymer (1). The obtained adhesive composition was formed into an adhesive sheet in the same manner as in Example 1, and the dismantlability thereof was evaluated. The obtained results are shown in Table 1 and FIG. 3.

Example 4

Figure 4:
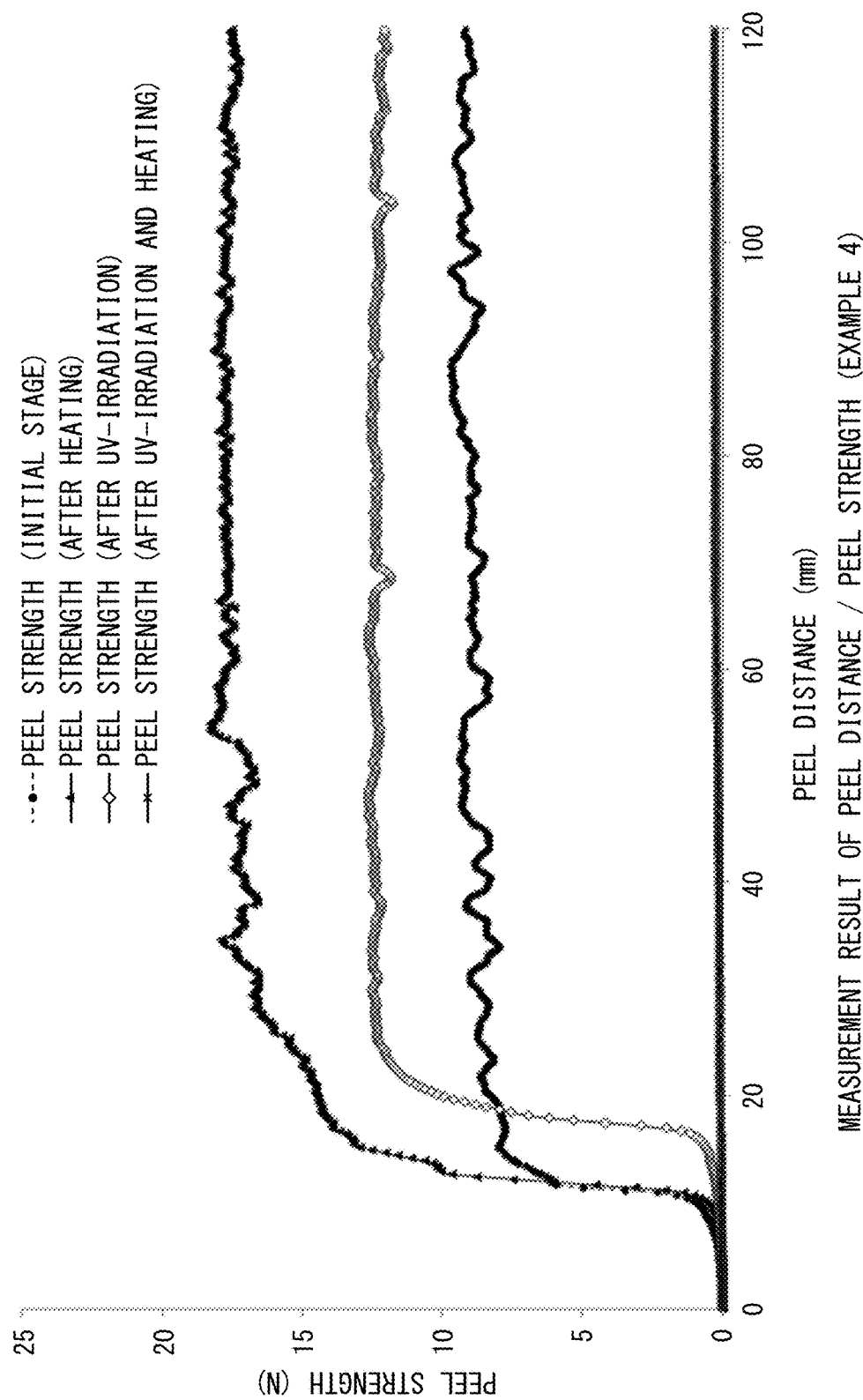
FIG. 4 is a view showing 180° peel strengths (N/20 mm) and peel distances (mm/20 mm width) measured before and alter heating, measured after UV irradiation, and measured after both UV irradiation and heating in Example 4.

An adhesive composition was prepared in the same manner as in Example 1, except that the acrylic block copolymer (4) obtained in Production example 4 was used instead of the acrylic block copolymer (1). The obtained adhesive composition was formed into an adhesive sheet in the same manner as in Example 1, and the dismantlability thereof was evaluated. The obtained results are shown in Table 1 and FIG. 4.

Comparative Example 1

Figure 5:
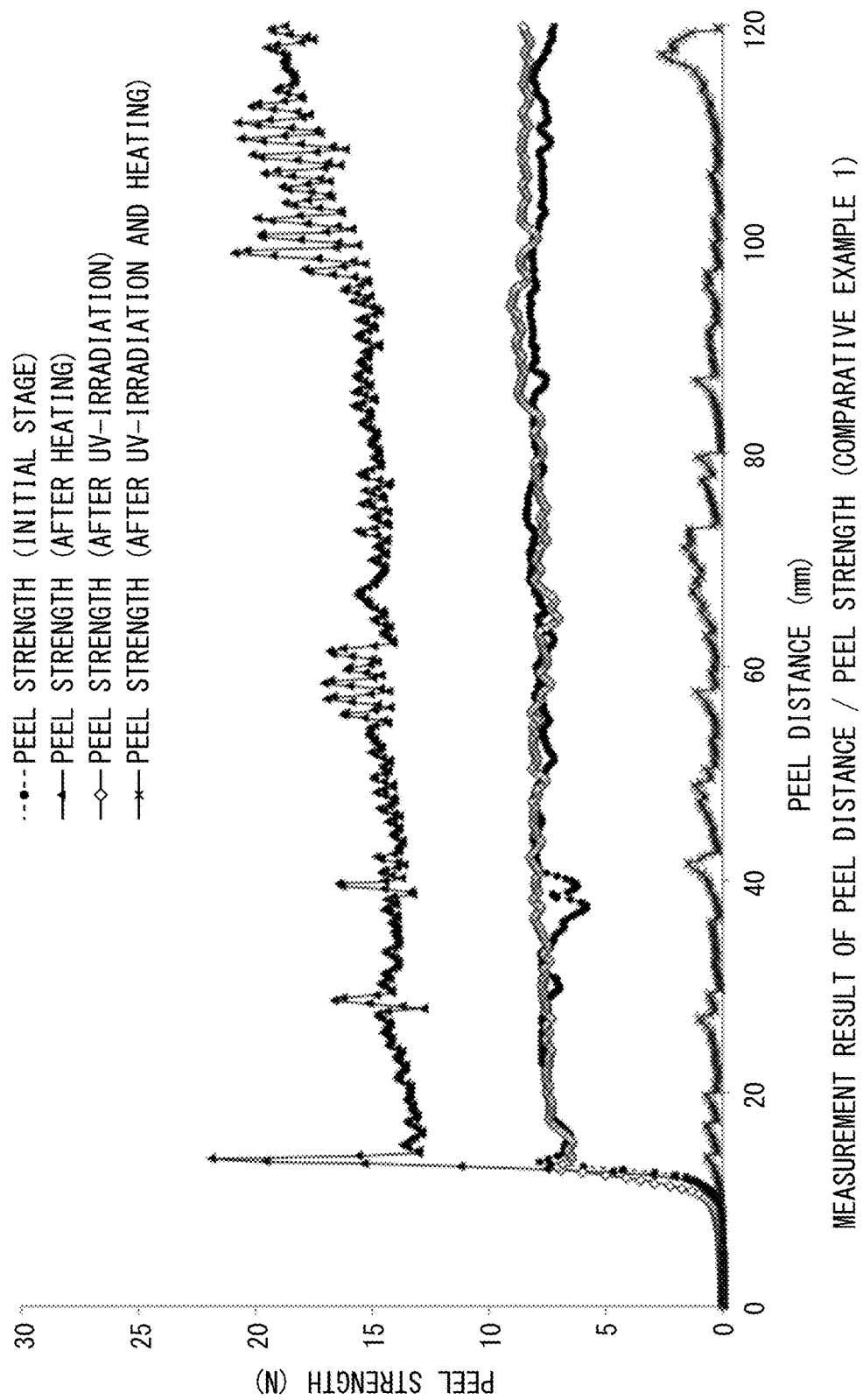
FIG. 5 is a view showing 180° peel strengths (N/20 mm) and peel distances (mm/20 mm width) measured before and after heating, measured after UV irradiation, and measured after both UV irradiation and heating in Comparative example 1.

An adhesive composition was prepared in the same manner as in Example 1, except that the acrylic random copolymer (1) obtained in Production example 5 was used instead of the acrylic block copolymer (1). The obtained adhesive composition was formed into an adhesive sheet in the same manner as in Example 1, and the dismantlability thereof was evaluated. The obtained results are shown in Table 1 and FIG. 5.

Comparative Example 2

Figure 6:
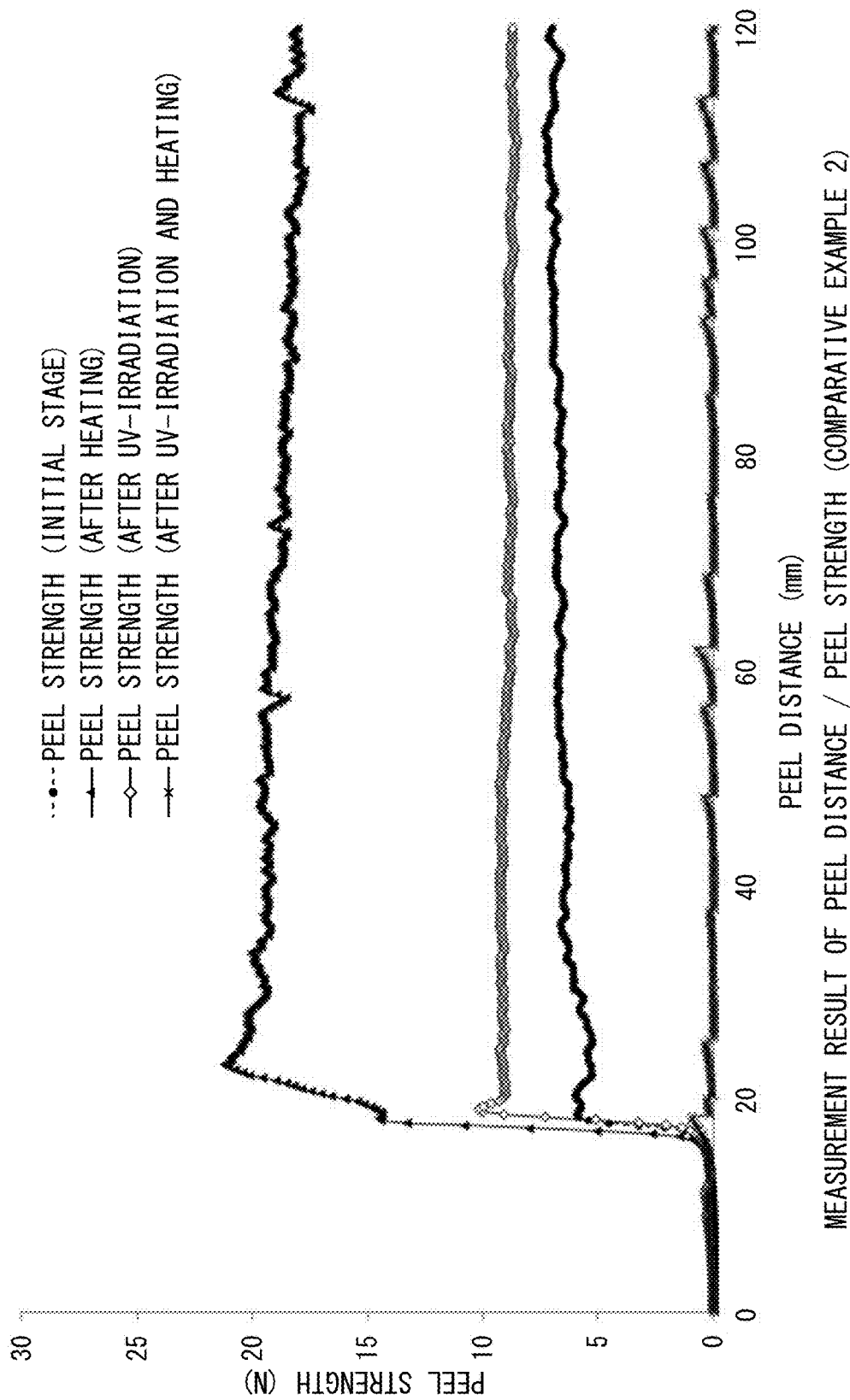
FIG. 6 is a view showing 180° peel strengths (N/20 mm) and peel distances (mm/20 mm width) measured before and after heating, measured after UV irradiation, and measured after both UV irradiation and heating in Comparative example 2.

An adhesive composition was prepared in the same manner as in Example 1, except that the acrylic random copolymer (2) obtained in Production example 6 was used instead of the acrylic block copolymer (1). The obtained adhesive composition was formed into an adhesive sheet in the same manner as in Example 1, and the dismantlability thereof was evaluated. The obtained results are shown in Table 1 and FIG. 6.

Comparative Example 3

Figure 7:
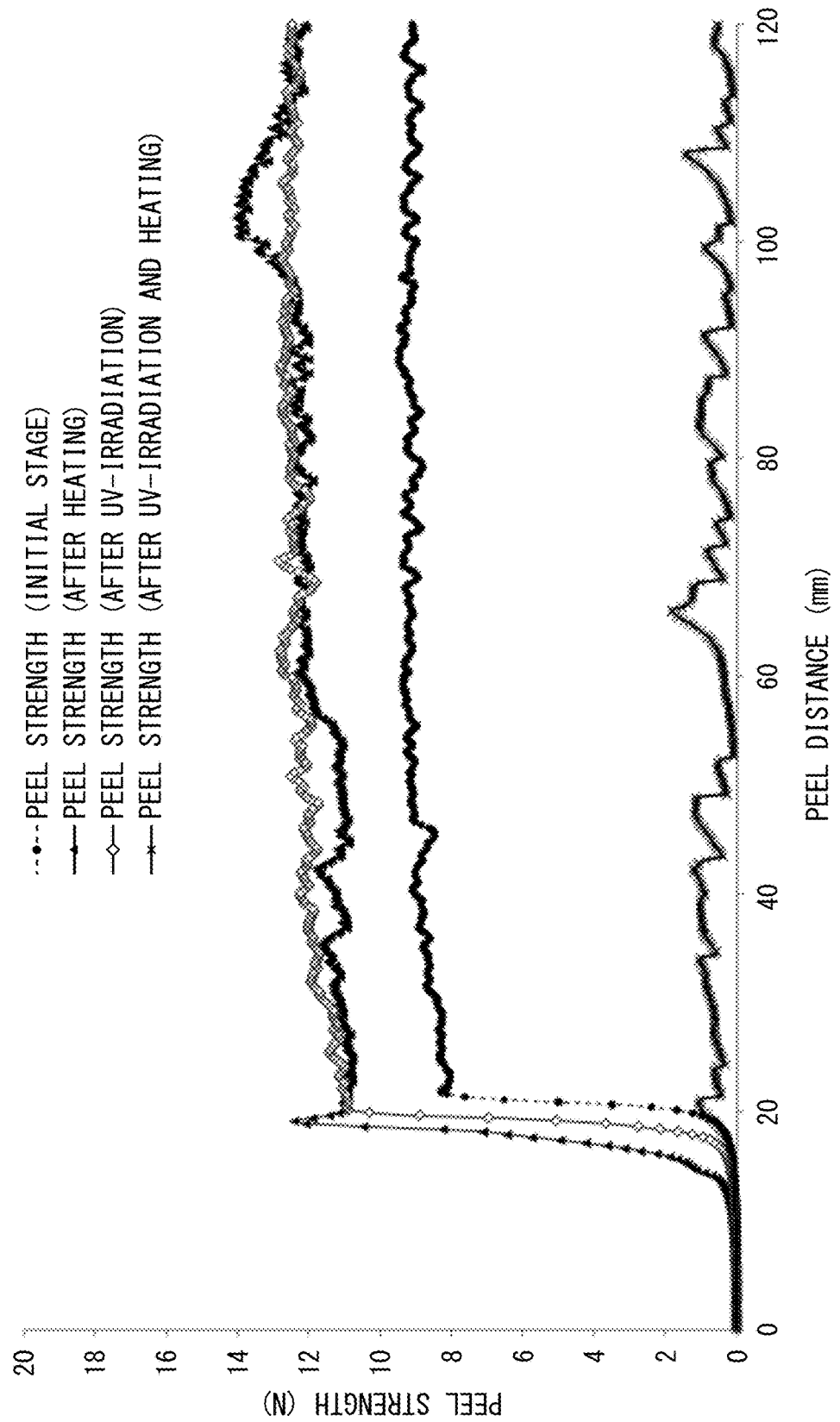
FIG. 7 is a view showing 180° peel strengths (N/20 mm) and peel distances (mm/20 mm width) measured before and after heating, measured after UV irradiation, and measured after both UV irradiation and heating in Comparative example 3.

An adhesive composition was prepared in the same manner as in Example 1, except that the acrylic random copolymer (3) obtained in Production example 7 was used instead of the acrylic block copolymer (1). The obtained adhesive composition was formed into an adhesive sheet in the same manner as in Example 1, and the dismantlability thereof was evaluated according to the following Dismantlability test 1. The obtained results are shown in Table 1 and FIG. 7.

Example 5

Figure 8:
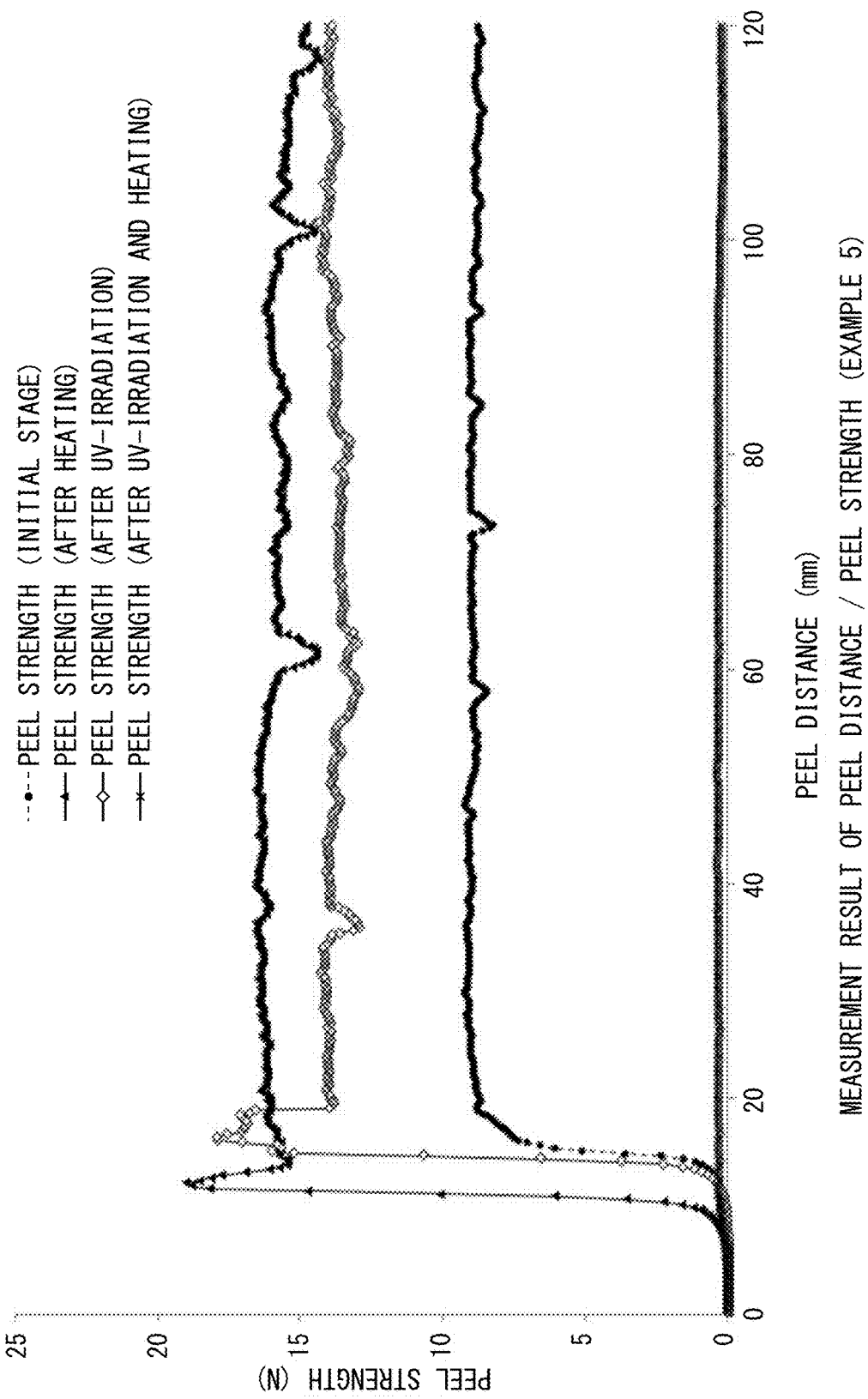
FIG. 8 is a view showing 180° peel strengths (N/20 mm) and peel distances (mm/20 mm width) measured before and after heating, measured after UV irradiation, and measured after both UV irradiation and heating in Example 5.

An adhesive composition was prepared in the same manner as in Example 1, except that the composition was obtained by adding N-hydroxynaphthalimide triflate (NIT) as a photo-acid generator to the acrylic block copolymer (5) obtained in Production example 8, in an amount of 0.4% by mole based on the cyclohexyl group in the acrylic block copolymer (5), instead of adding N-hydroxynaphthalimide triflate (NIT) as a photo-acid generator to the acrylic block copolymer (1), in an amount of 0.4% by mole based on the t-butyl group in the acrylic block copolymer (1). The obtained adhesive composition was formed into an adhesive sheet in the same manner as in Example 1, and the dismantlability thereof was evaluated. The obtained results are shown in Table 1 and FIG. 8.

Example 6

Figure 9:
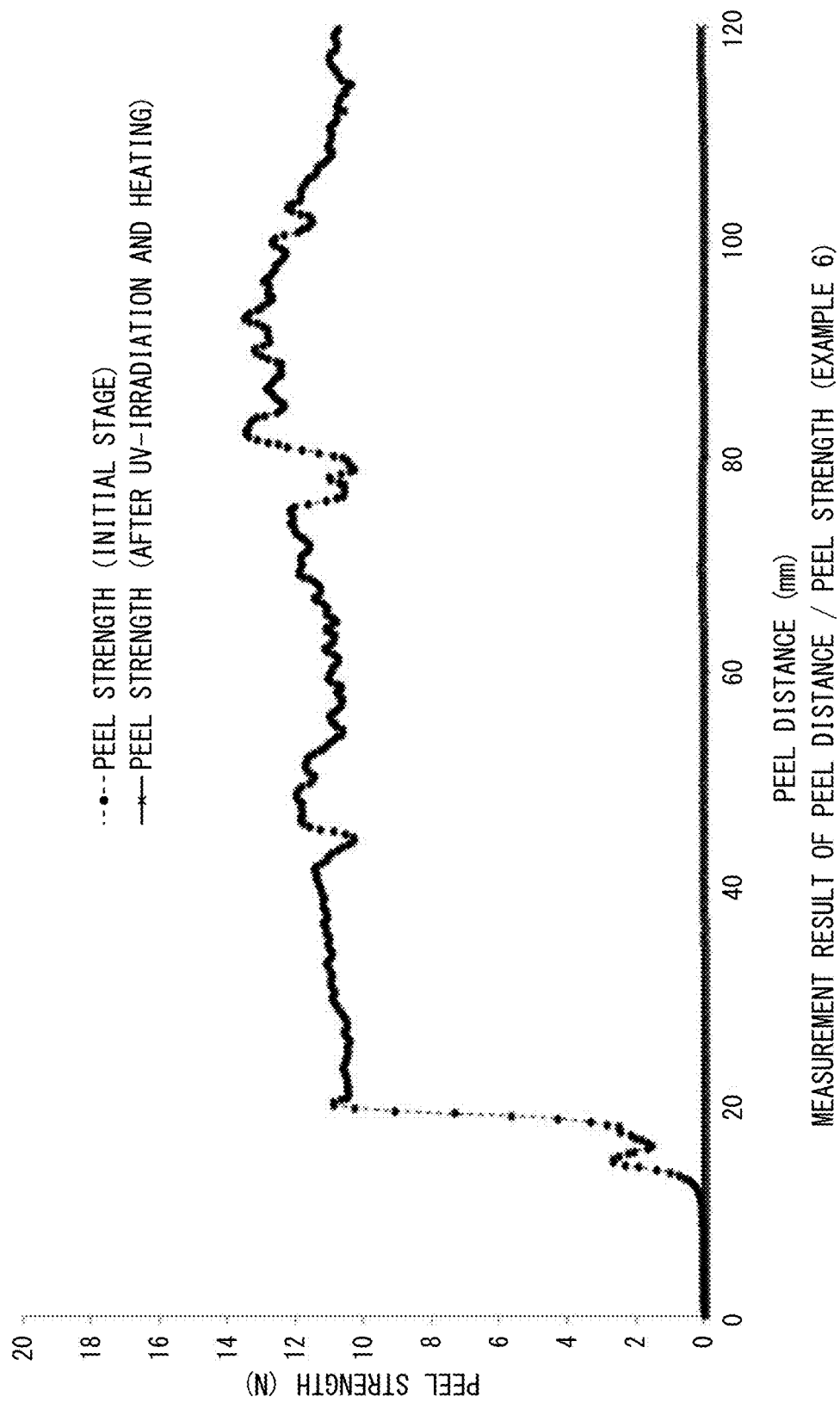
FIG. 9 is a view showing 180° peel strengths (N/20 mm) and peel distances (mm/20 mm width) measured at the initial stage and after UV irradiation and heating in Example 6.

An adhesive composition was prepared in the same manner as in Example 1, except that the acrylic block copolymer (6) obtained in Production example 9 was used instead of the acrylic block copolymer (1). The obtained adhesive composition was formed into an adhesive sheet in the same manner as in Example 1, and the dismantlability thereof was evaluated. The obtained results are shown in Table 2 and FIG. 9.

Example 7

Figure 10:
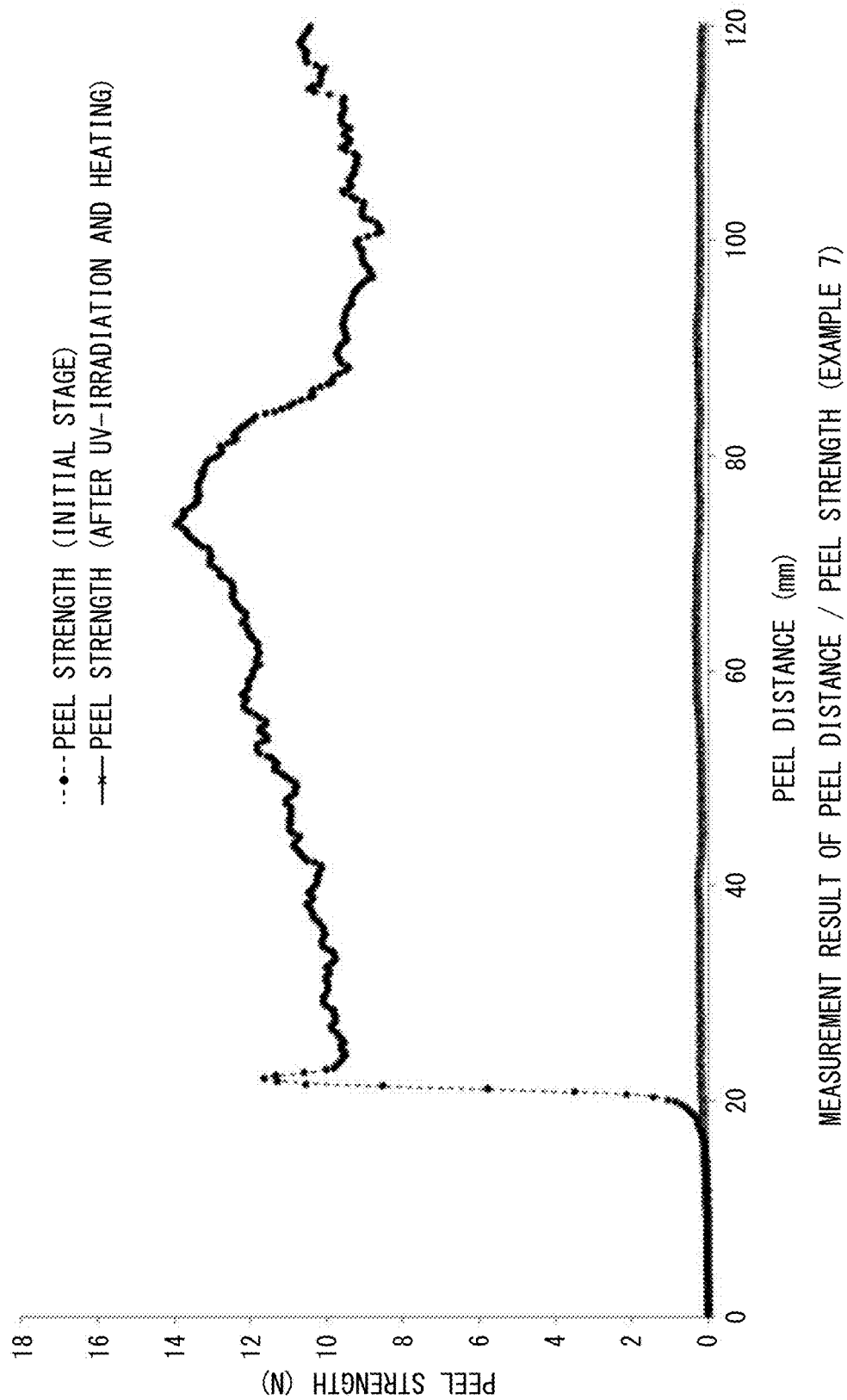
FIG. 10 is a view showing 180° peel strengths (N/20 mm) and peel distances (mm/20 mm width) measured at the initial stage and after UV irradiation and heating in Example 7.

An adhesive composition was prepared in the same manner as in Example 1, except that the acrylic block copolymer (7) obtained in Production example 10 was used instead of the acrylic block copolymer (1). The obtained adhesive composition was formed into an adhesive sheet in the same manner as in Example 1, and the dismantlability thereof was evaluated. The obtained results are shown in Table 2 and FIG. 10.

Example 8

Figure 11:
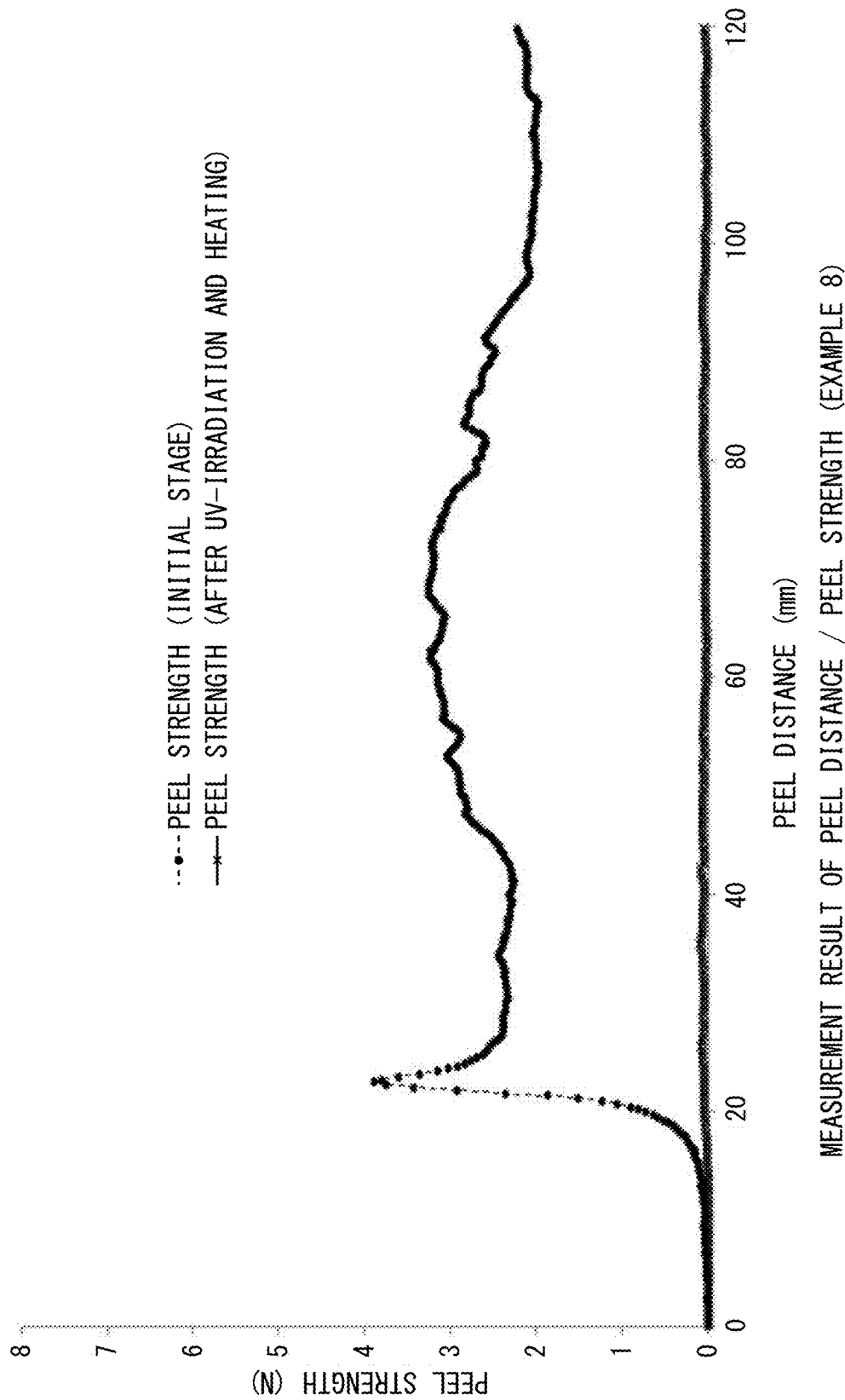
FIG. 11 is a view showing 180° peel strengths (N/20 mm) and peel distances (mm/20 mm width) measured at the initial stage and after UV irradiation and heating in Example 8.

An adhesive composition was prepared in the same manner as in Example 1, except that the composition was obtained by adding N-hydroxynaphthalimide triflate (NIT) as a photo-acid generator to the acrylic block copolymer (8) obtained in Production example 11, in an amount of 0.3% by mole based on the t-butyl group in the acrylic block copolymer (8), instead of adding N-hydroxynaphthalimide triflate (NIT) as a photo-acid generator to the acrylic block copolymer (1), in an amount of 0.4% by mole based on the t-butyl group in the acrylic block copolymer (1). The obtained adhesive composition was formed into an adhesive sheet in the same manner as in Example 1, and the dismantlability thereof was evaluated. The obtained results are shown in Table 2 and FIG. 11.

Example 9

Figure 12:
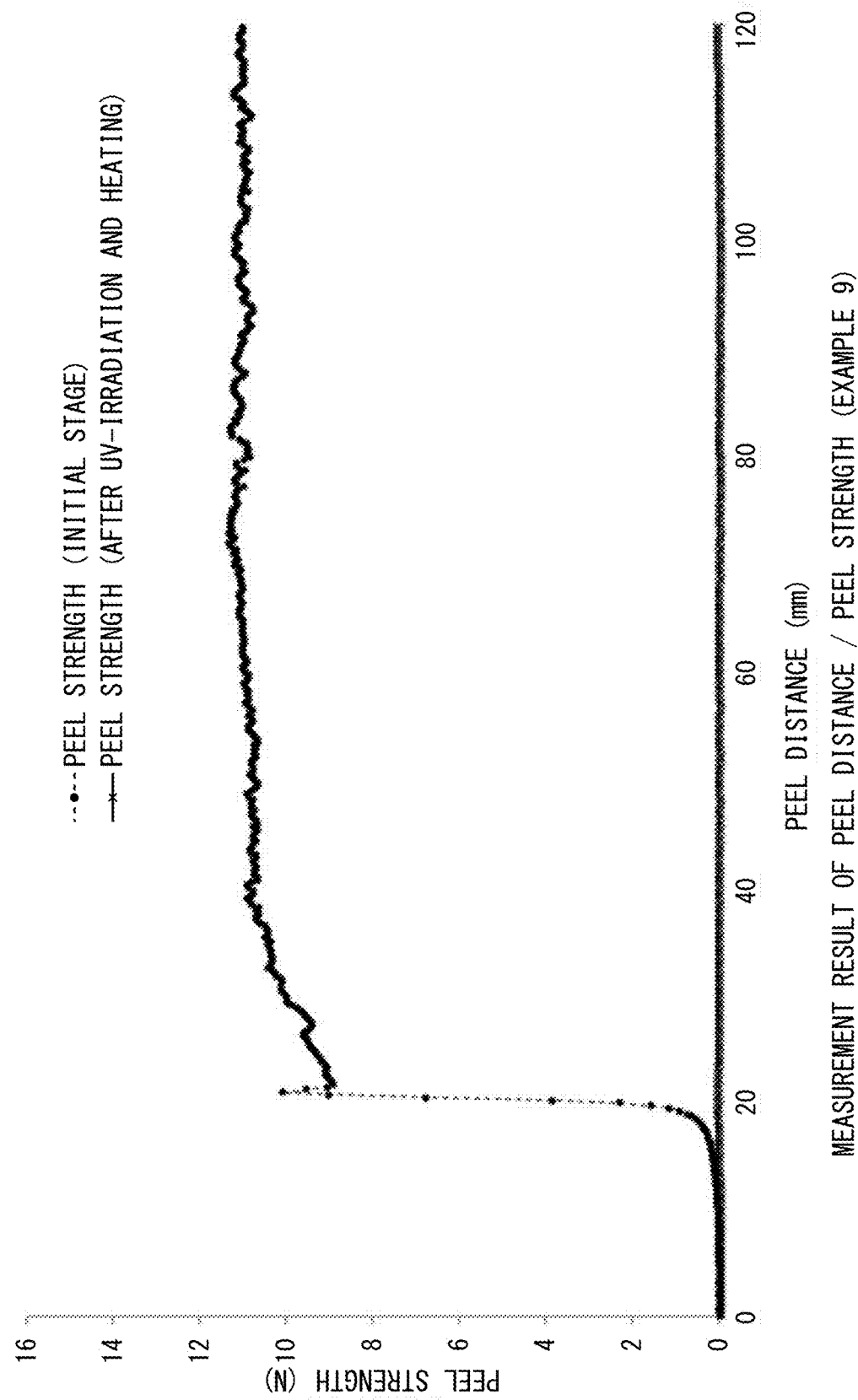
FIG. 12 is a view showing 180° peel strengths (N/20 mm) and peel distances (mm/20 mm width) measured at the initial stage and after UV irradiation and heating in Example 9.

An adhesive composition was prepared in the same manner as in Example 1, except that the composition was obtained by adding N-hydroxynaphthalimide triflate (NIT) as a photo-acid generator to the acrylic block copolymer (9) obtained in Production example 12, in an amount of 0.7% by mole based on the t-butyl group in the acrylic block copolymer (9), instead of adding N-hydroxynaphthalimide triflate (NIT) as a photo-acid generator to the acrylic block copolymer (1), in an amount of 0.4% by mole based on the t-butyl group in the acrylic block copolymer (1). The obtained adhesive composition was formed into an adhesive sheet in the same manner as in Example 1, and the dismantlability thereof was evaluated. The obtained results are shown in Table 2 and FIG. 12.

Example 10

Figure 13:
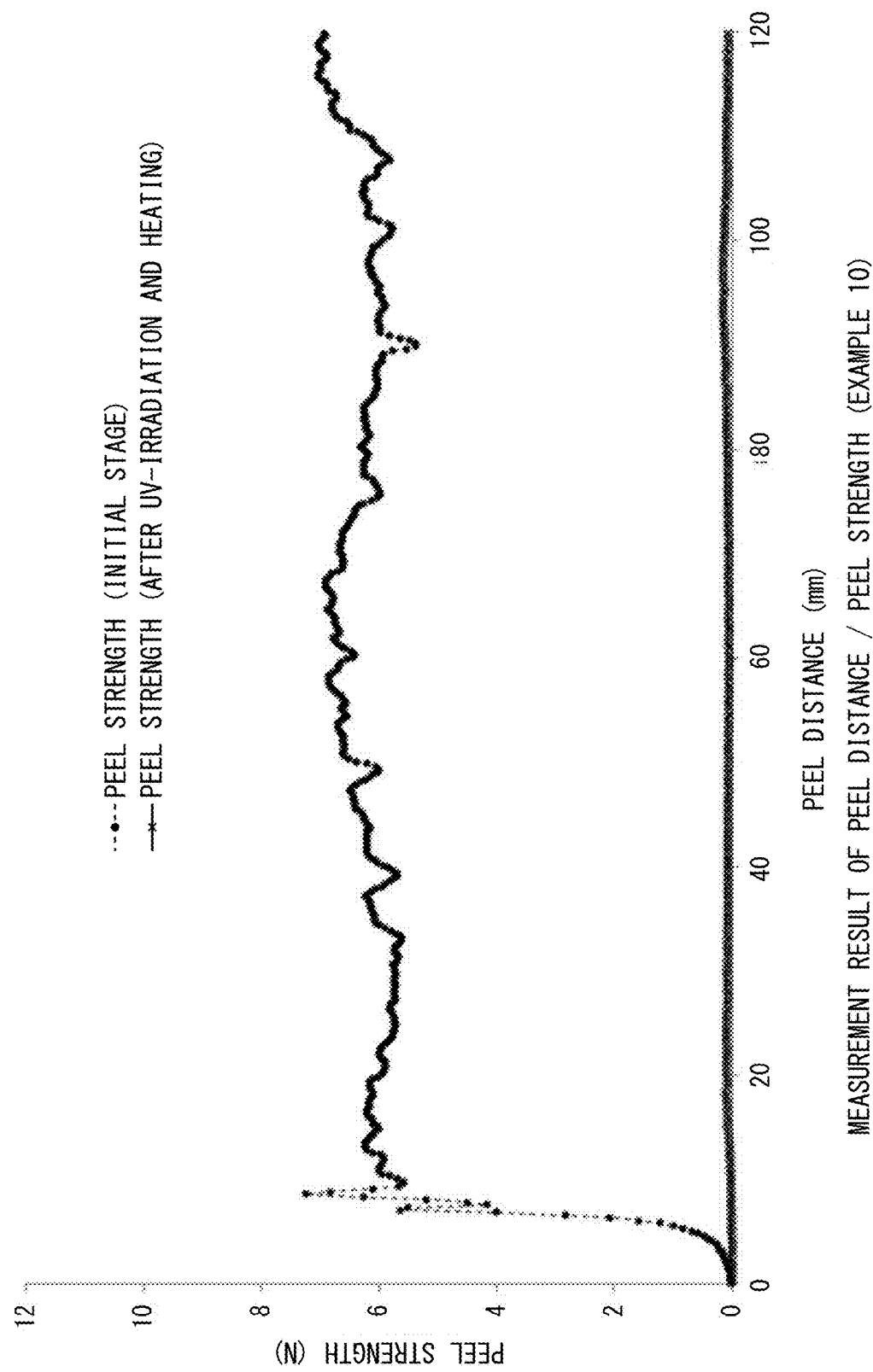
FIG. 13 is a view showing 180° peel strengths (N/20 mm) and peel distances (mm/20 mm width) measured at the initial stage and after UV irradiation and heating in Example 10.

An adhesive composition was prepared in the same manner as in Example 1, except that the composition was obtained by adding N-hydroxynaphthalimide triflate (NIT) as a photo-acid generator to the acrylic block copolymer (10) obtained in Production example 13, in an amount of 2.9% by mole based on the t-butyl group in the acrylic block copolymer (10), instead of adding N-hydroxynaphthalimide triflate (NIT) as a photo-acid generator to the acrylic block copolymer (1), in an amount of 0.4% by mole based on the t-butyl group in the acrylic block copolymer (1). The obtained adhesive composition was formed into an adhesive sheet in the same manner as in Example 1, and the dismantlability thereof was evaluated. The obtained results are shown in Table 2 and FIG. 13.

Example 11

Figure 14:
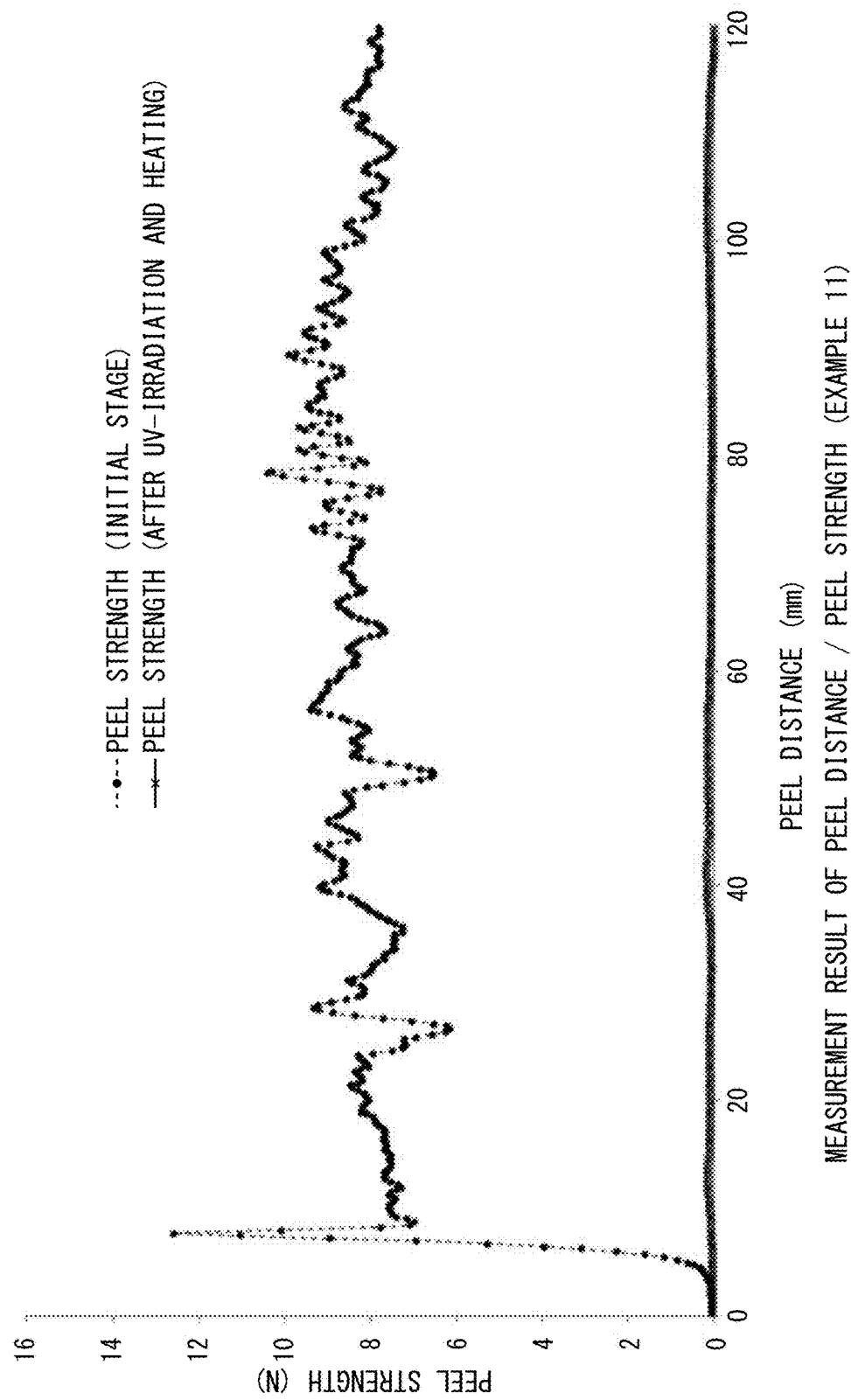
FIG. 14 is a view showing 180° peel strengths (N/20 mm) and peel distances (mm/20 mm width) measured at the initial stage and after UV irradiation and heating in Example 11.

An adhesive composition was prepared in the same manner as in Example 1, except that the acrylic block copolymer (11) obtained in Production example 14 was used instead of the acrylic block copolymer (1). The obtained adhesive composition was formed into an adhesive sheet in the same manner as in Example 1, and the dismantlability thereof was evaluated. The obtained results are shown in Table 2 and FIG. 14.

Example 12

An adhesive composition was prepared in the same manner as in Example 1, except that the acrylic block copolymer (12) obtained in Production example 15 was used instead of the acrylic block copolymer (1). The obtained adhesive composition was formed into an adhesive sheet in the same manner as in Example 1, and the dismantlability thereof was evaluated. The obtained results are shown in Table 3.

Example 13

An adhesive composition was prepared in the same manner as in Example 1, except that the acrylic block copolymer (13) obtained in Production example 16 was used instead of the acrylic block copolymer (1). The obtained adhesive composition was formed into an adhesive sheet in the same manner as in Example 1, and the dismantlability thereof was evaluated. The obtained results are shown in Table 3.

<Dismantlability Test 1>

The adhesive sheets obtained in Examples 1 to 5 and Comparative examples 1 to 3 were cut in the form of short strips having a width of 20 mm and a length of 175 mm, and the strips were bonded onto an SUS plate having a width of 50 mm, a length of 150 mm, and a thickness of 0.5 mm in an environment of 23° C. and 50% RH, by being pressed with a hand roller weighing 2 kg that reciprocated once, thereby preparing four similar test pieces.

One of the test pieces, which were bonded by pressure, was allowed to stand for 1 hour in an environment of 23° C. and 50% RH and then peeled off by using a tensile tester at a rate of 30 mm/min to measure a 180° peel strength (initial stage).

One of the test pieces, which were bonded by pressure, was allowed to stand for 30 minutes in an environment of 23° C. and 50% RH, followed by heating for 1 hour at 100° C. (130° C. for Example 5), and then left (for about 30 minutes) to cool to 23° C. (heating).

One of the test pieces, which were bonded by pressure, was allowed to stand for 30 minutes in an environment of 23° C. and 50% RH, followed by UV irradiation for 1 hour at room temperature, and then allowed to stand for another 30 minutes (UV irradiation).

One of the test pieces, which were bonded by pressure, was allowed to stand for 30 minutes in an environment of 23° C. and 50% RH, followed by UV irradiation for 1 hour at room temperature, then heated for 1 hour at 100° C. (130° C. for Example 5), and left (for about 30 minutes) to cool to 23° C. (UV→heating).

These test pieces were peeled off by using a tensile tester at a rate of 30 mm/min to measure a 180° peel strength. In the tables, the average of the peel strengths measured at a peel distance of 30 to 120 mm is indicated, and for test pieces showing stick-slip, the amplitude is indicated.

Moreover, for UV irradiation, a laboratory mercury lamp "SHL-100UVQ-2" (75 W) manufactured by Toshiba, Inc. was used as a light source, the distance between the light source and the sample was set to 10 cm, and from a point in time when the time elapsed after lighting of the lamp became not shorter than 15 minutes, irradiation was performed on the sample (irradiation was performed under the same conditions in the following examples and comparative examples).

The adhesive sheets obtained in Examples 6 to 13 were cut in the form of short strips having a width of 20 mm and a length of 175 mm, and the strips were bonded onto an SUS plate having a width of 50 mm, a length of 150 mm, and a thickness of 0.5 mm in an environment of 23° C. and 50% RH by being pressed with a hand roller weighing 2 kg that reciprocated once, thereby preparing two similar test pieces.

One of the test pieces, which were bonded by pressure, was allowed to stand for 1 hour in an environment of 23° C. and 50% RH and then peeled off by using a tensile tester at a rate of 30 mm/min to measure a 180° peel strength (initial stage).

The other test piece, which was bonded by pressure, was allowed to stand for 30 minutes in an environment of 23° C. and 50% RH, followed by UV irradiation for 1 hour at room temperature, then heated for 1 hour at 100° C., and left (for about 30 minutes) to cool to 23° C. (UV→heating).

These test pieces were peeled off by using a tensile tester at a rate of 30 mm/min to measure a 180° peel strength. In the tables, the average of the peel strengths measured at a peel distance of 30 to 120 mm is indicated, and for test pieces showing stick-slip, the amplitude is indicated.

For UV irradiation, the same light source as the above was used.

TABLE 1

| | | Example 1 | Example 2 | Example 3 | Example 4 | Example 5 | Comparative example 1 | Comparative example 2 | Comparative example 3 |
|---|---|---|---|---|---|---|---|---|---|
| Form of copolymerization | | Block | Block | Block | Block | Block | Random | Random | Random |
| Acrylic polymer | tBA | 24.2 | 28.7 | 37.9 | 33.4 | | 35.5 | 33.1 | 39 |
| | co-tBA | 5 | 4 | 5.4 | 1.1 | | | | |
| | Total tBA | 29.2 | 32.7 | 43.3 | 34.5 | | 35.5 | 33.1 | 39 |
| | CHA | | | | | 37.4 | | | |
| | co-CHA | | | | | 3 | | | |
| | Total CHA | | | | | 40.4 | | | |
| | 2EHA | | | 52.5 | 47 | 34.4 | | | 42 |
| | nBA | 67 | 52.3 | | | | 60.8 | 53 | |
| | HEA | 3.9 | 14.9 | 4.3 | 18.5 | 25.2 | 3.7 | 13.9 | 19 |
| Molecular weight | Mw | 354000 | 570000 | 383000 | 462000 | 216600 | 463000 | 475000 | 580300 |
| | Mw/Mn | 1.48 | 2.14 | 1.49 | 1.74 | 2.28 | 1.67 | 1.88 | 2.03 |
| Acid generator | NIT | 0.4 | 0.4 | 0.4 | 0.4 | 0.4 | 0.4 | 0.4 | 0.4 |
| Adhesive force N/20 mm | Initial stage | 9.1 | 4.8 | 5.6 | 9 | 8.9 | 7.7 | 6.7 | 9.1 |
| | Heating | 18.8 | 16.5 | 8.3 | 17.6 | 15.7 | 16 | 18.7 | 12.2 |
| | UV | 10.2 | 11.2 | 9.7 | 12.3 | 13.8 | 8.1 | 8.9 | 12.4 |
| | UV→heating | 0 | 0 | 0.2 | 0 | 0.35 | 0.14-2.65 (SS) | 0-0.95 (SS) | 0.07-1.82 (SS) |

TABLE 2

| | | Example 6 | Example 7 | Example 8 | Example 9 | Example 10 | Example 11 |
|---|---|---|---|---|---|---|---|
| Form of copolymerization | | Block | Block | Block | Block | Block | Block |
| Acrylic polymer | t-BA | 33.8 | 32.3 | 40.7 | 18.6 | 3.3 | 28.1 |
| | co-tBA | 6.5 | 7.9 | 4.9 | 2.3 | 1.5 | 8.3 |
| | Total tBA | 40.3 | 40.2 | 45.6 | 20.9 | 4.8 | 36.4 |
| | 2EHA | 48.9 | 52 | 44.5 | 56.8 | 63.2 | 55.3 |
| | HEA | 10.8 | 7.8 | 9.9 | 22.3 | 32 | 8.3 |

TABLE 2-continued

|  |  | Example 6 | Example 7 | Example 8 | Example 9 | Example 10 | Example 11 |
|---|---|---|---|---|---|---|---|
| Molecular weight | Mw | 269000 | 304000 | 196000 | 357000 | 395000 | 372000 |
|  | Mw/Mn | 1.43 | 1.49 | 1.4 | 1.66 | 1.56 | 1.82 |
| Acid generator | NIT | 0.4 | 0.4 | 0.3 | 0.7 | 2.9 | 0.4 |
| Adhesive force N/20 mm | Initial stage | 11.5 | 10.8 | 2.8 | 10.9 | 6.4 | 8.3 |
|  | UV→heating | 0 | 0.2 | 0.1 | 0 | 0 | 0 |

TABLE 3

|  |  | Example 12 | Example 13 |
|---|---|---|---|
| Form of copolymerization |  | Block | Block |
| Acrylic polymer | tBA | 23.2 | 32.3 |
|  | co-tBA | 4.7 | 4.7 |
|  | Total tBA | 27.9 | 37 |
|  | 2EHA |  | 45.5 |
|  | nBA | 60.7 |  |
|  | HEA | 11.4 |  |
|  | HBA |  | 17.5 |
| Molecular weight | Mw | 304000 | 323000 |
|  | Mw/Mn | 1.6 | 1.67 |
| Acid generator | NIT | 0.4 | 0.4 |
| Adhesive force N/20 mm | Initial stage | 6.6 | 11.7 |
|  | UV→heating | 0 | 0.4 |

In the tables, the numerical values of the respective components of the acrylic polymer indicate molar ratios. Moreover, the respective abbreviations in the table are as follows, and "SS" in the section of the Adhesive force shows that stick-slip occurred.

tBA: t-butyl acrylate forming a poly-t-butyl acrylate chain.

co-tBA: t-butyl acrylate contained in a polyacrylate chain which is copolymerized with a poly-t-butyl acrylate chain and formed of other copolymerization components.

CHA: cyclohexyl acrylate forming a polycyclohexyl acrylate chain.

co-CHA: cyclohexyl acrylate contained in a polyacrylate chain which is copolymerized with a polycyclohexyl acrylate chain and formed of other copolymerization components.

2EHA: 2-ethylhexyl acrylate
nBA: n-butyl acrylate
HEA: 2-hydroxyethyl acrylate
HBA: 4-hydroxybutyl acrylate Example 14

Figure 15:
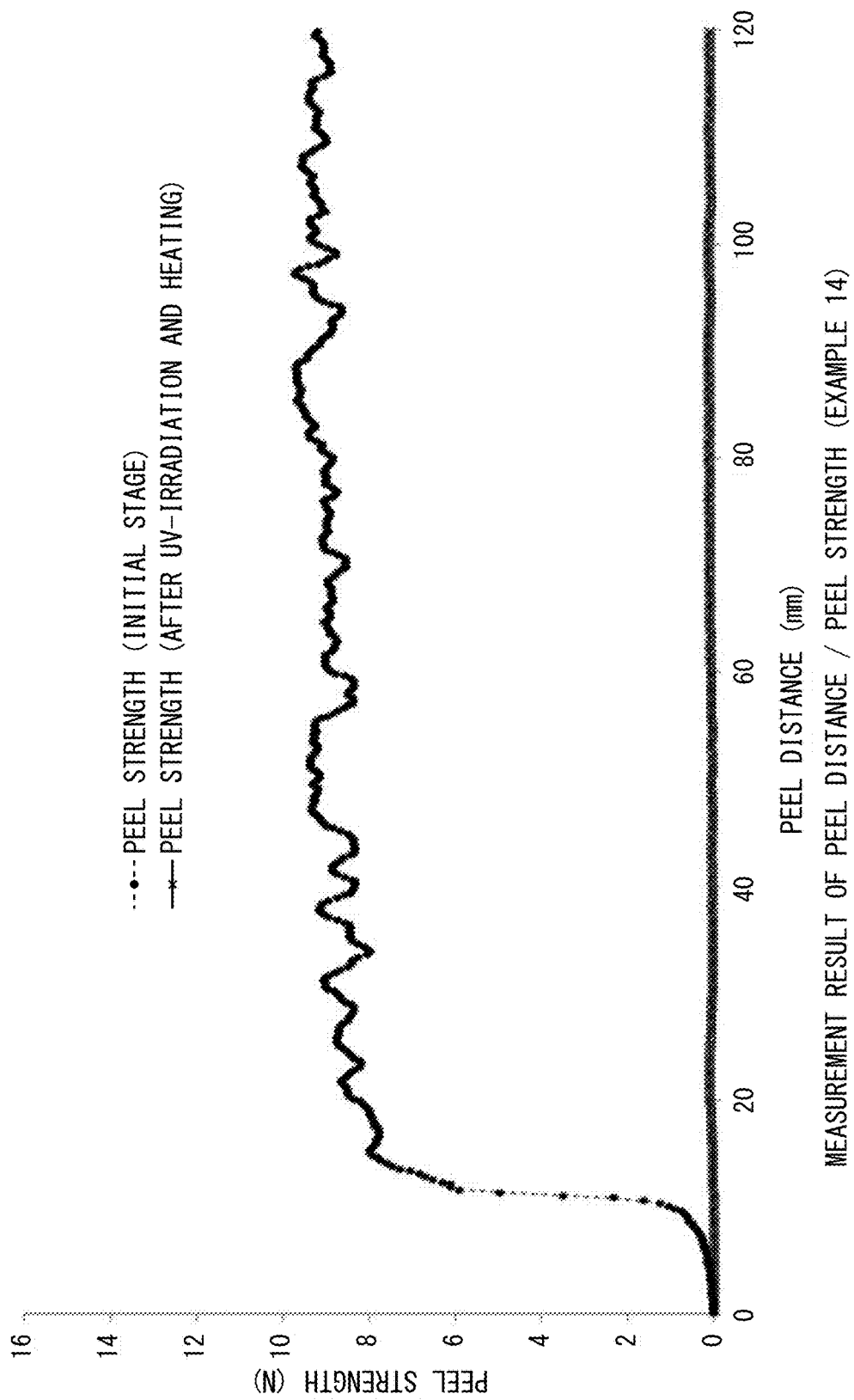
FIG. 15 is a view showing 180° peel strengths (N/20 mm) and peel distances (mm/20 mm width) measured at the initial stage and after UV irradiation and heating in Example 14.

The dismantlability of an adhesive sheet prepared in the same manner as in Example 4 was evaluated according to the following Dismantlability test 2. The obtained results are shown in Table 4 and FIG. 15.

Comparative Example 4

Figure 16:
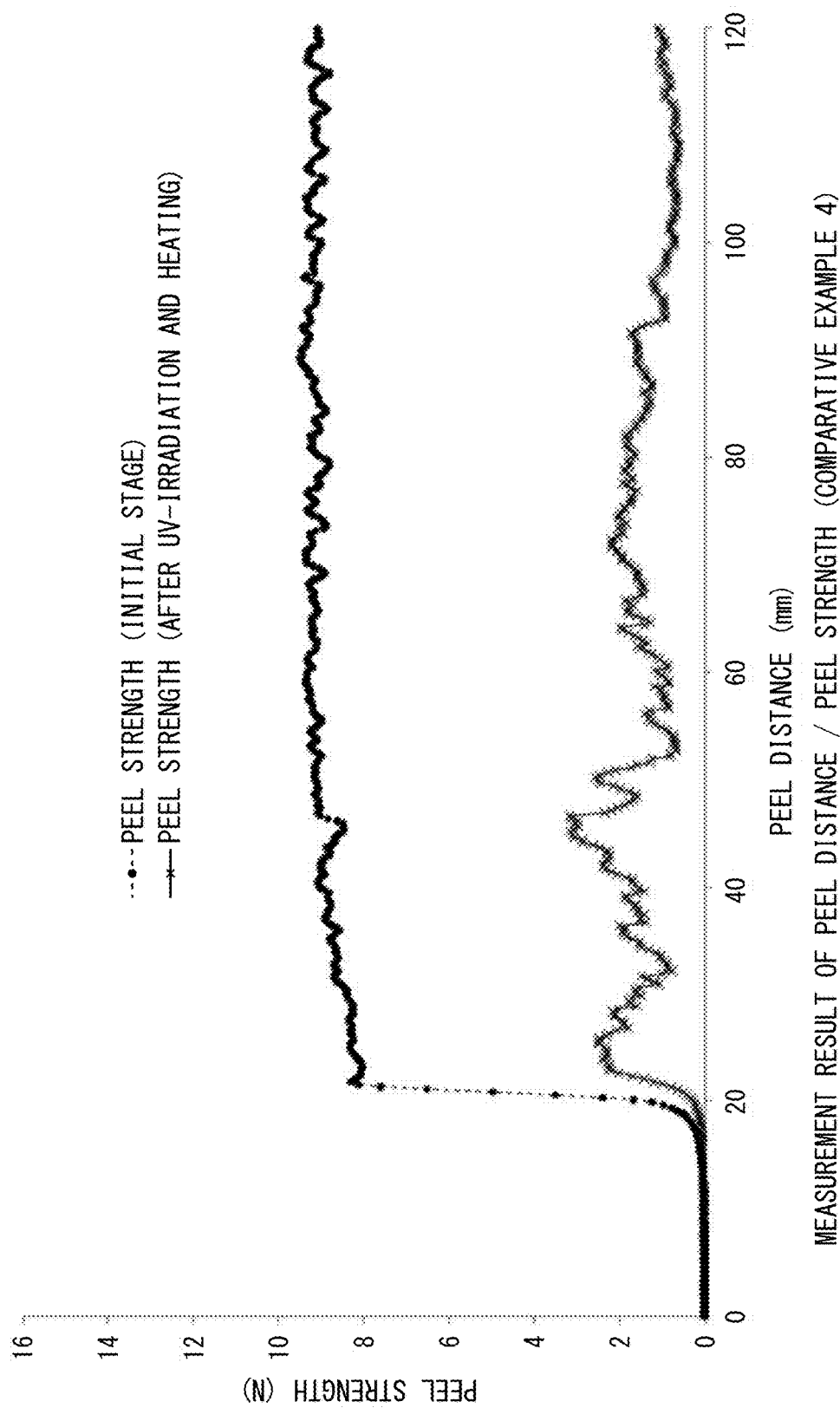
FIG. 16 is a view showing 180° peel strengths (N/20 mm) and peel distances (mm/20 mm width) measured at the initial stage and after UV irradiation and heating in Comparative example 4.

The dismantlability of an adhesive sheet prepared in the same manner as in Comparative example 3 was evaluated according to the following Dismantlability test 2. The obtained results are shown in Table 4 and FIG. 16.

<Dismantlability Test 2>

The adhesive sheet was cut in the form of short strips having a width of 20 mm and a length of 175 mm and bonded onto an SUS plate having a width of 50 mm, a length of 150 mm, and a thickness of 0.5 mm in an environment of 23° C. and 50%, by being pressed with a hand roller weighing 2 kg that reciprocated once.

The test piece, which was bonded by pressure, was allowed to stand for 30 minutes in an environment of 23° C. and 50%, followed by UV irradiation for 5 minutes at room temperature, then heated for 5 minutes at 150° C., and left (for about 30 minutes) to cool to 23° C. (short time dismantlement). The test piece was peeled off by using a tensile tester at a rate of 30 mm/min to measure a 180° peel strength. In the table, the average of peel strengths measured at a peel distance of 30 to 120 mm is indicated.

TABLE 4

|  |  | Example 14 | Comparative example 4 |
|---|---|---|---|
| Form of copolymerization |  | Block | Random |
| Acrylic polymer | Total tBA | 34.5 | 39 |
|  | 2EHA | 47 | 42 |
|  | HEA | 18.5 | 19 |
| Molecular weight | Mw | 462000 | 580300 |
|  | Mw/Mn | 1.74 | 2.03 |
| Acid generator | NIT | 0.4 | 0.4 |
| Adhesive force N/20 mm | Initial stage | 9 | 9.1 |
|  | UV irradiation (1 hour)→heating (100° C., 1 hour) | 0 | 0-1.82 (SS) |
|  | UV irradiation (5 minutes)→heating (150° C., 5 minutes) | 0 | 0.6-3.17 (SS + CF) |

In the table, the numerical values of the respective components in the acrylic polymer indicate molar ratios. The meaning of the abbreviations in the table is the same as in Table 1. "SS+CF" in the section of the Adhesive force shows that stick-slip and cohesive failure occurred concurrently.

Example 15

Figure 17:
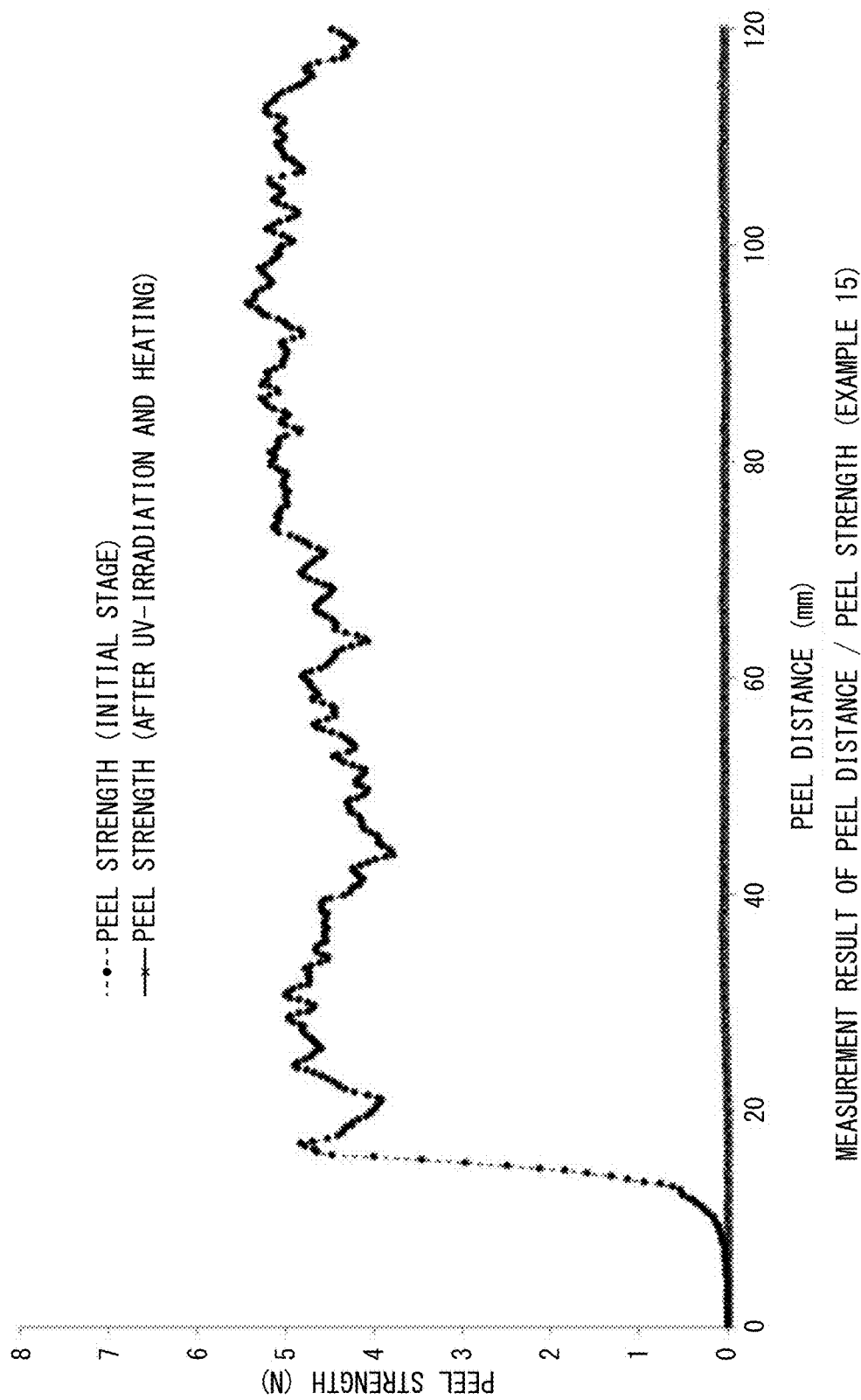
FIG. 17 is a view showing 180° peel strengths (N/20 mm) and peel distances (mm/20 mm width) measured at the initial stage and after heating. UV irradiation, and reheating in Example 15.

The dismantlability of an adhesive sheet prepared in the same manner as in Example 2 was evaluated according to the following Dismantlability test 3. The obtained results are shown in Table 5 and FIG. 17.

Example 16

Figure 18:
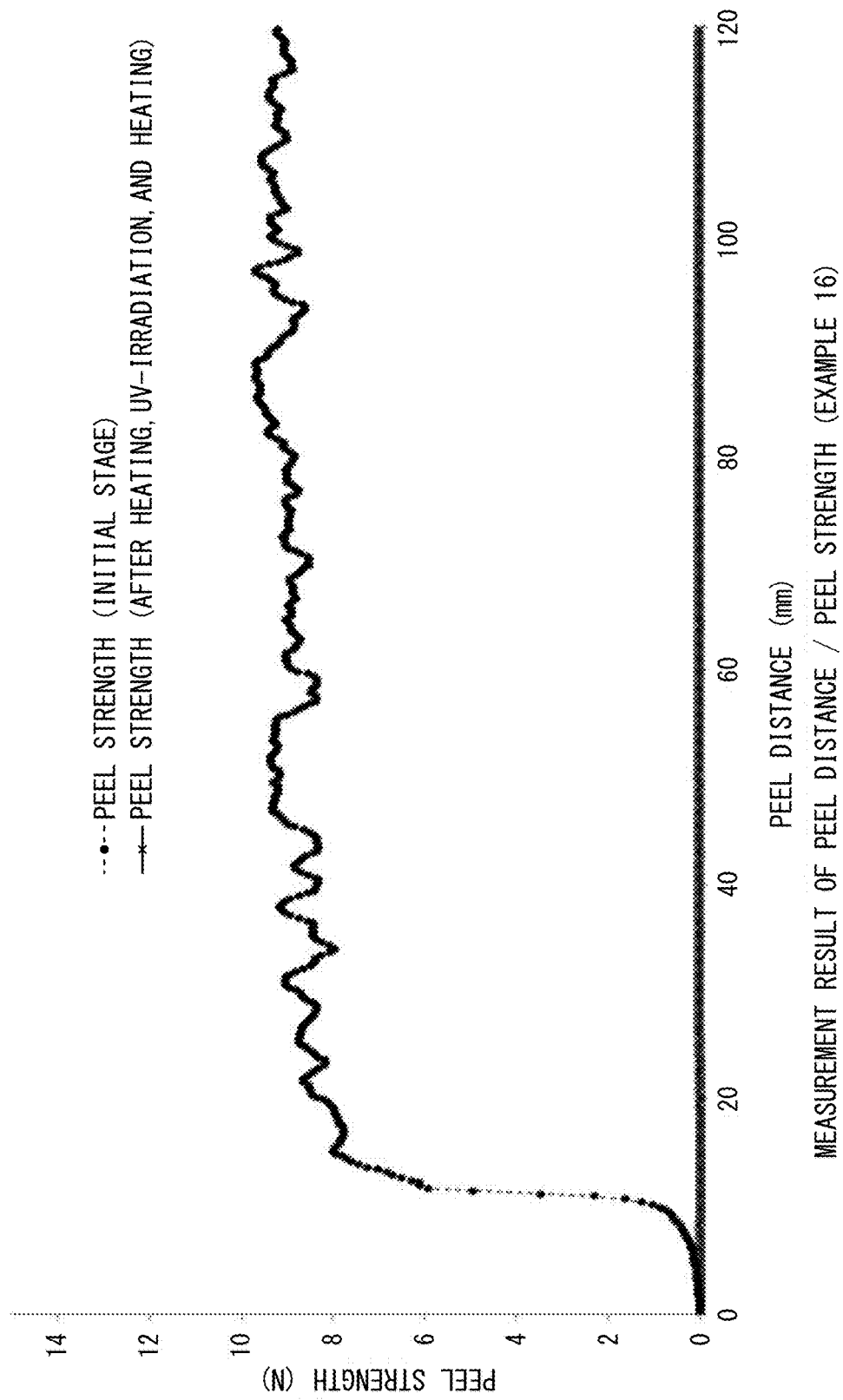
FIG. 18 is a view showing 180° peel strengths (N/20 mm) and peel distances (mm/20 mm width) measured at the initial stage and after heating. UV irradiation, and reheating in Example 16.

The dismantlability of an adhesive sheet prepared in the same manner as in Example 4 was evaluated according to the following Dismantlability test 3. The obtained results are shown in Table 5 and FIG. 18.

Comparative Example 5

Figure 19:
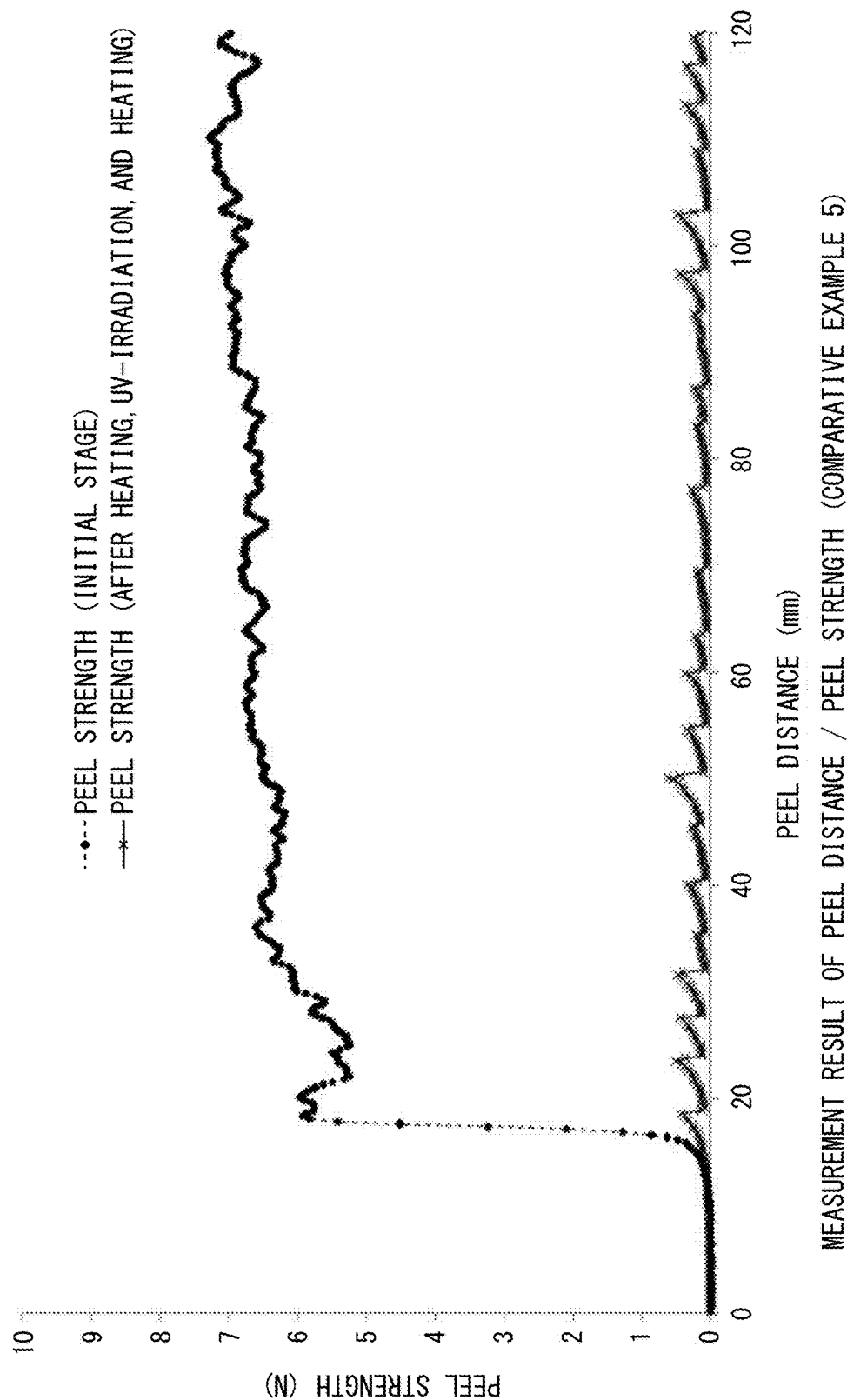
FIG. 19 is a view showing 180° peel strengths (N/20 mm) and peel distances (mm/20 mm width) measured at the initial stage and after heating. UV irradiation, and reheating in Comparative example 5.

The dismantlability of an adhesive sheet prepared in the same manner as in Comparative example 2 was evaluated according to the following Dismantlability test 3. The obtained results are shown in Table 5 and FIG. 19.

Comparative Example 6

Figure 20:
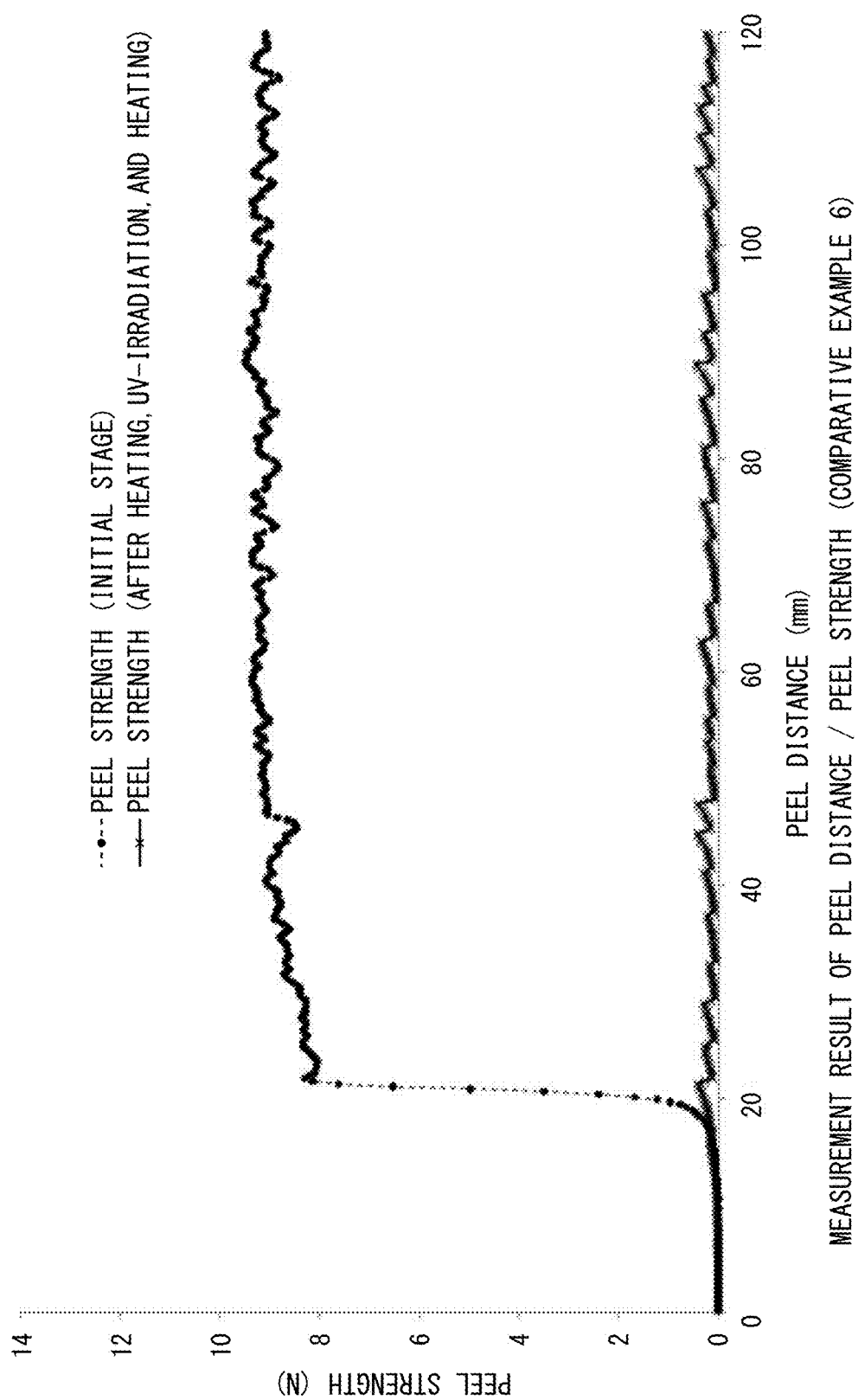
FIG. 20 is a view showing 180° peel strengths (N/20 mm) and peel distances (mm/20 mm width) measured at the initial stage and after heating, UV irradiation, and reheating in Comparative example 6.

The dismantlability of an adhesive sheet prepared in the same manner as in Example 3 was evaluated according to the following Dismantlability test 3. The obtained results are shown in Table 5 and FIG. 20.

<Dismantlability Test 3>

The adhesive sheet was cut in the form of short strips having a width of 20 mm and a length of 175 mm and bonded onto an SUS plate having a width of 50 mm, a length of 150 m, and a thickness of 0.5 mm in an environment of 23° C. and 50%, by being pressed with a hand roller weighing 2 kg that reciprocated once, thereby preparing a test piece.

The test piece that was bonded by pressure was allowed to stand for 30 minutes in an environment of 23° C. and 50%, followed by heating for 1 hour at 100° C., and left to cool to room temperature. Thereafter, the test piece was irradiated with UV rays for 1 hour at room temperature and then heated for 1 hour at 100° C. The test piece was left to cool to room temperature, allowed to stand for 30 minutes, and peeled off by using a tensile tester at a rate of 30 mm/min to measure a 180° peel strength. In the table, the average of the peel strengths measured at a peel distance of 30 to 120 mm is indicated.

TABLE 5

| | | Example 15 | Example 16 | Comparative example 5 | Comparative example 6 |
|---|---|---|---|---|---|
| Form of copolymerization | | Block | Block | Random | Random |
| Acrylic polymer | tBA | 28.7 | 33.4 | 33.1 | 39 |
| | co-tBA | 4 | 1.1 | | |
| | Total tBA | 32.7 | 34.5 | 33.1 | 39 |
| | 2EHA | | 47 | | 42 |
| | nBA | 52.3 | | 53 | |
| | HEA | 14.9 | 18.5 | 13.9 | 19 |
| Molecular weight | Mw | 570000 | 462000 | 475000 | 580300 |
| | Mw/Mn | 2.14 | 1.74 | 1.88 | 2.03 |
| Acid generator | NIT | 0.4 | 0.4 | 0.4 | 0.4 |
| Adhesive force N/20 mm | Initial stase | 4.8 | 9 | 6.7 | 9.1 |
| | UV irradiation (1 hour)→heating (100° C., 1 hour) | 0 | 0 | 0-0.95 (SS) | 0.07-1.82 (SS) |
| | Heating (100° C., 1 hour)→UV irradiation (1 hour)→heating (100° C., 1 hour) | 0 | 0 | 0.05-0.62 (SS) | 0.04-0.45 (SS) |

In the table, the numerical values of the respective components in the acrylic polymer indicate molar ratios. The meaning of the abbreviations in the table is the same as in Table 1, and "SS" in the section of Adhesive force shows that stick-slip occurred.

Results in Tables 1 to 3 clearly show that the adhesive compositions of Examples 1 to 13 according to the present invention, each using the acrylic block polymer having the polymer chain formed of the carboxyl precursor group-containing (meth)acrylate monomer and the polymer chain containing the acrylate monomer and the polar group-containing monomer as monomer components, had favorable adhesiveness and dismantlability and did not cause stick-slip even at the time of dismantlement. Moreover, the adhesive compositions of Examples 2, 4, and 5 to 13, each containing the polar group-containing monomer in an amount of 5% by mass or more, had particularly excellent dismantlability and made dismantlement be performed favorably at an interface between the adhesive layer and the substrate at the time of dismantlement. On the other hand, the adhesive compositions of Comparative examples 1 to 3, each using the acrylic random copolymer, did not exhibit favorable dismantlability and caused stick-slip at the time of dismantlement.

Results in Table 4 clearly show that the adhesive composition of Example 14 using the acrylic block copolymer having the polymer chain formed of carboxyl precursor group-containing (meth)acrylate monomer and the polymer chain containing the acrylate monomer and the polar group-containing monomer as monomer components exhibited favorable dismantlability under the conditions of short time dismantlement (UV irradiation for 5 minutes and heating for 5 minutes at 150° C.) and did not cause stick-slip even at the time of dismantlement. On the other hand, the adhesive composition of Comparative example 3 using the acrylic random polymer caused cohesive failure and stick-slip at the time of short time dismantlement, and the 180° peel strength thereof was not sufficiently reduced.

Results in Table 5 clearly show that the adhesive compositions of Examples 15 and 16 according to the present invention, each using the acrylic block polymer having a polymer chain formed of the carboxyl precursor group-containing (meth)acrylate monomer and the polymer chain containing the acrylate monomer and the polar group-containing monomer as monomer components, had favorable adhesiveness and dismantlability and did not cause stick-slip even at the time of dismantlement. On the other hand, the adhesive compositions of Comparative examples 5 and 6, each using the acrylic random polymer, caused stick-slip at the time of dismantlement.

INDUSTRIAL APPLICABILITY

The easily dismantlable adhesive composition according to the present invention makes it possible to realize easy dismantlement by a simple method such as heating or light-irradiation without deteriorating adhesive properties of the acrylic polymer. Specifically, when the adhesive tape is peeled off from an adherend or when the adhesive layer is peeled off from the substrate, stick-slip does not easily occur. Therefore, parts stuck to the tape are not easily broken, an adhesive residue does not easily remain, and workability at the time of dismantlement becomes favorable. Accordingly, the composition can be favorably used to fix parts, temporarily fix parts, label for displaying product information, or the like, without particular limitation, in various industrial fields of OA equipment, IT and home appliances, automobiles, or the like, that can be recycled or reused. Moreover, at the time of dismantlement, the composition can be easily dismantled by simple heating equipment, energy ray irradiation equipment, or the like. Particularly, even when members that are easily cracked, such as thin image display modules used in organic EL, panels or liquid crystal panels, transparent conductive glass having a transparent conductive layer, or thin glass such as panel surface-protecting glass, are fixed with an adhesive tape, if the adhesive tape of the present invention is used, the tape can be dismantled without cracking the members.

The invention claimed is:

1. A dismantlable adhesive tape comprising an adhesive layer formed on a substrate, wherein the adhesive layer comprises a dismantlable adhesive composition comprising:
   an acrylic polymer; and
   an acid catalyst or an acid generator,
   wherein the acrylic polymer is an acrylic block polymer having:
   a poly(meth)acrylate chain (A) formed of a carboxyl precursor group-containing (meth)acrylate monomer (a), the poly(meth)acrylate chain (A) having a carboxyl precursor group; and
   a poly(meth)acrylate chain (B) formed of monomer components comprising a (meth)acrylate (b) having an alkyl group having 1 to 14 carbon atoms, the (meth)acrylate (b) not being the carboxyl precursor group-containing (meth)acrylate monomer (a), and a a hydroxyl group-containing vinyl monomer,
   wherein when heating the dismantlable adhesive tape, the carboxyl precursor group is able to become a carboxyl group upon such that the adhesive layer of the dismantlable adhesive tape decreases the adhesive force,
   wherein a content of the carboxyl precursor group-containing (meth)acrylate monomer (a) is 1% by mass to 60% by mass based on a total of monomer components constituting the acrylic polymer,
   wherein a content of the acid catalyst or the acid generator is 0.1% by mole to 10% by mole, based on 1 mol of a carboxyl precursor group contained in the carboxyl precursor group-containing (meth)acrylate monomer (a).

2. The dismantlable adhesive tape according to claim 1, wherein the carboxyl precursor group-containing (meth)acrylate monomer (a) is at least one selected from the group consisting of tert-butyl (meth)acrylate, 2-methyl-2-adamantyl (meth)acrylate, 2-ethyl-2-adamantyl (meth)acrylate, bornyl (meth)acrylate, isobornyl (meth)acrylate, cyclohexyl (meth)acrylate, and benzyl (meth)acrylate.

3. The dismantlable adhesive tape according to claim 1, wherein the (meth)acrylate (b) having an alkyl group having 1 to 14 carbon atoms is at least one selected from the group consisting of 2-ethylhexyl (meth)acrylate and n-butyl (meth)acrylate.

4. The dismantlable adhesive tape according to claim 1, wherein a ratio of the poly(meth)acrylate chain (A) to the poly(meth)acrylate chain (B) in the acrylic polymer is 75/25 to 1/99 in terms of a molar ratio of (A)/(B).

5. The dismantlable adhesive tape according to claim 1, wherein the content of the hydroxyl group-containing vinyl monomer is 1 to 30% by mass based on the total monomer components forming the acrylic block polymer.

6. The dismantlable adhesive tape according to claim 1, wherein the adhesive layer of the dismantlable adhesive tape generates a gas between the substrate and an adherend adhered to the adhesive layer when the carboxyl precursor group becomes a carboxyl group, thereby decreasing an adhesive force between the substrate of the dismantlable adhesive tape and the adherend.

7. The dismantlable adhesive tape according to claim 1, wherein the dismantlable adhesive tape has an adhesive force of 1 N/20 mm or more.

8. The dismantlable adhesive tape according to claim 1, wherein the carboxyl precursor group-containing (meth)acrylate monomer (a) is selected from the group consisting of sec-butyl (meth)acrylate, isopropyl (meth)acrylate, sec-hexyl (meth)acrylate, sec-octyl (meth)acrylate, sec-nonyl (meth)acrylate, sec-decyl (meth)acrylate, bornyl (meth)acrylate, isobornyl (meth)acrylate, cyclohexyl (meth)acrylate, tert-butyl (meth)acrylate, tert-hexyl (meth)acrylate, tert-octyl (meth)acrylate, tert-nonyl (meth)acrylate, tert-decyl (meth)acrylate, 2-alkyl-2-adamantyl (meth)acrylate, 2-methyl-2-adamantyl (meth)acrylate and benzyl (meth)acrylate;
wherein the (meth)acrylate (b) is selected from the group consisting of methyl (meth)acrylate, ethyl (meth)acrylate, n-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth)acrylate, n-tridecyl (meth)acrylate, and n-tetradecyl (meth)acrylate.

9. The dismantlable adhesive tape according to claim 1, wherein the dismantlable adhesive tape has an adhesive force of 3 to 20 N/20 mm.

10. The dismantlable adhesive tape according to claim 1, wherein the adhesive layer of the dismantlable adhesive tape decreases the adhesive force when the dismantlable adhesive tape is irradiated with light and heated.

11. The dismantlable adhesive tape according to claim 1, wherein when the dismantlable adhesive composition comprises the acid catalyst, the carboxyl precursor group is dissociated from the poly(meth)acrylate chain (A) by the action of the acid catalyst when the dismantlable adhesive tape is heated.

12. The dismantlable adhesive tape according to claim 1, wherein when the dismantlable adhesive composition comprises the acid generator, the carboxyl precursor group is dissociated from the poly(meth)acrylate chain (A) by the action of the acid generator when the dismantlable adhesive tape is irradiated with light and heated.

* * * * *